United States Patent
Kikuchi et al.

(10) Patent No.: US 8,709,640 B2
(45) Date of Patent: Apr. 29, 2014

(54) MULTI-LAYER, MICROPOROUS POLYOLEFIN MEMBRANE, ITS PRODUCTION METHOD, BATTERY SEPARATOR AND BATTERY

(75) Inventors: Shintaro Kikuchi, Saitama-ken (JP); Kotaro Takita, Tochigi-ken (JP); Junko Takita, legal representative, Tochigi-ken (JP)

(73) Assignee: Toray Battery Separator Film Co., Ltd, Tochigi (JP)

( * ) Notice: Subject to any disclaimer, the term of this patent is extended or adjusted under 35 U.S.C. 154(b) by 629 days.

(21) Appl. No.: 12/675,717

(22) PCT Filed: Aug. 29, 2008

(86) PCT No.: PCT/JP2008/066023
§ 371 (c)(1),
(2), (4) Date: Jul. 12, 2010

(87) PCT Pub. No.: WO2009/028734
PCT Pub. Date: Mar. 5, 2009

(65) Prior Publication Data
US 2010/0295511 A1   Nov. 25, 2010

(30) Foreign Application Priority Data
Aug. 31, 2007 (JP) .................................. 2007-227163

(51) Int. Cl.
*H01M 2/16* (2006.01)
(52) U.S. Cl.
USPC .......................................................... 429/144
(58) Field of Classification Search
USPC ...................................... 264/173.12; 429/144
See application file for complete search history.

(56) References Cited

U.S. PATENT DOCUMENTS

| 5,480,745 A | 1/1996 | Nishiyama et al. |
| 5,856,039 A * | 1/1999 | Takahashi .................... 429/129 |
| 6,602,593 B1 | 8/2003 | Callahan et al. |
| 7,985,497 B2 | 7/2011 | Takita et al. |
| 2007/0037034 A1 | 2/2007 | Fisher et al. |

(Continued)

FOREIGN PATENT DOCUMENTS

| EP | 1081775 A2 | 3/2001 |
| EP | 1 897 903 A1 | 3/2008 |

(Continued)

OTHER PUBLICATIONS

European Search Report dated Sep. 13, 2010.

(Continued)

*Primary Examiner* — Larry Thrower
(74) *Attorney, Agent, or Firm* — Sughrue Mion, PLLC

(57) ABSTRACT

The invention relates to polyolefin membranes and membrane precursors comprising polyethylene and polypropylene. The polyolefin membrane can be a microporous polyolefin membrane comprising a first microporous layer and at least one second microporous layers where the first and second layers contain polypropylene and polyethylene, and the amount of polyethylene in the first layer is at least about 80 wt. % and the amount of polyethylene in the second layer is at least about 50 wt. %. The amount of polyethylene is higher in the first microporous layer than in the second microporous layer, and the total amount of the polyethylene in the first and second microporous layers is at least about 61 wt. %, based on the weight of the multi-layer, microporous polyolefin membrane.

7 Claims, 1 Drawing Sheet

(56) References Cited

U.S. PATENT DOCUMENTS

2009/0098450 A1  4/2009  Kikuchi et al.
2009/0117455 A1  5/2009  Takita et al.
2009/0274955 A1* 11/2009  Kikuchi et al. ............... 429/144

FOREIGN PATENT DOCUMENTS

| | | |
|---|---|---|
| EP | 1 942 000 A1 | 7/2008 |
| EP | 1 946 905 A1 | 7/2008 |
| JP | 07-216118 A | 8/1995 |
| JP | 09-259857 A | 10/1997 |
| JP | 10-195215 A | 7/1998 |
| JP | 10-279718 A | 10/1998 |
| JP | 2000-133236 A | 5/2000 |
| JP | 2002-321323 A | 11/2002 |
| WO | 2004/089627 A1 | 10/2004 |
| WO | 2006/137535 A1 | 12/2006 |
| WO | 2007010878 A1 | 1/2007 |
| WO | 2007/037290 A1 | 4/2007 |
| WO | 2007/046473 A1 | 4/2007 |
| WO | 2007/049568 A1 | 5/2007 |

OTHER PUBLICATIONS

International Search Report for International Application No. PCT/JP2008/066023, dated Dec. 9, 2008.
Chinese Office Action dated Mar. 2, 2012 issued in counterpart Chinese Patent Application No. 200880105120.0.

* cited by examiner

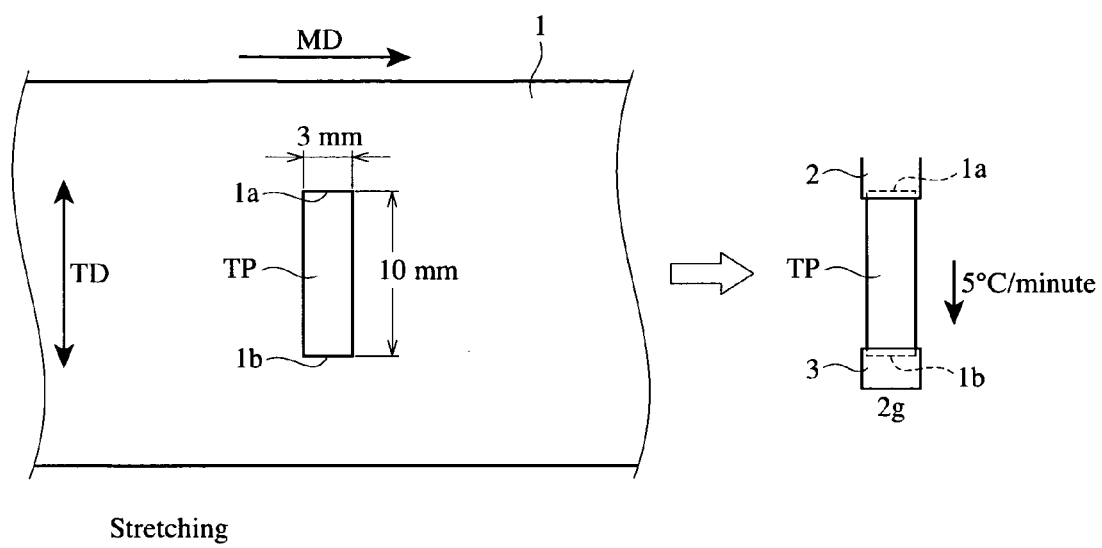

MULTI-LAYER, MICROPOROUS POLYOLEFIN MEMBRANE, ITS PRODUCTION METHOD, BATTERY SEPARATOR AND BATTERY

CROSS REFERENCE TO RELATED APPLICATIONS

This application is a National Stage of International Application No. PCT/JP2008/066023 filed Aug. 29, 2008, claiming priority based on Japanese Patent Application No. 2007-227163, filed Aug. 31, 2007, the contents of all of which are incorporated herein by reference in their entirety.

FIELD OF THE INVENTION

The invention relates to a multi-layer, microporous polyolefin membrane having suitably well-balanced permeability, pin puncture strength, shutdown temperature, shutdown speed, meltdown temperature, and thickness uniformity, a battery separator formed by such multi-layer, microporous polyolefin membrane, and a battery comprising such a separator. Another aspect of the invention relates to a method for making the multi-layer, microporous polyolefin membrane, a method for making a battery using such a membrane as a separator, and a method for using such a battery.

BACKGROUND OF THE INVENTION

Microporous polyolefin membranes can be used as battery separators in, e.g., primary and secondary lithium secondary batteries, lithium polymer batteries, nickel-hydrogen batteries, nickel-cadmium batteries, nickel-zinc batteries, silver-zinc secondary batteries, etc. When microporous polyolefin membranes are used for battery separators, particularly lithium ion battery separators, the membranes' performance significantly affects the properties, productivity and safety of the batteries. Accordingly, the microporous polyolefin membrane should have suitable mechanical properties, heat resistance, permeability, dimensional stability, shutdown properties, meltdown properties, etc. As is known, it is desirable for the batteries to have a relatively low shutdown temperature and a relatively high meltdown temperature for improved battery-safety properties, particularly for batteries that are exposed to high temperatures during manufacturing, charging, re-charging, use, and/or storage. Improving separator permeability generally leads to an improvement in the battery's storage capacity. High shutdown speed is desired for improved battery safety, particularly when the battery is operated under overcharge conditions. Improving pin puncture strength is desired because roughness of the battery's electrode can puncture the separator during manufacturing leading to a short circuit. Improved thickness uniformity is desired because thickness variations lead to manufacturing difficulties when winding the film on a core. Thickness variations can also lead to non-isotropic temperature variations in the battery, which can lead to battery hot-spots (regions of higher temperature) where the separator is relatively thin.

In general, microporous membranes containing polyethylene only (i.e., the membrane consists of, or consists essentially of, polyethylene) have low meltdown temperatures, while microporous membranes containing polypropylene only have high shutdown temperatures. Accordingly, microporous membranes comprising polyethylene and polypropylene as main components have been proposed as improved battery separators. It is therefore desired to provide microporous membranes formed from polyethylene resin and polypropylene resin, and multi-layer, microporous membranes comprising polyethylene and polypropylene.

JP7-216118A, for example, discloses a battery separator having a suitable shutdown temperature and mechanical strength. The patent publication discloses a battery separator comprising a multi-layer, porous film having two microporous layers. Both layers can contain polyethylene and polypropylene, but in different relative amounts. For example, the percentage of the polyethylene is 0 wt. % to 20 wt. % in the first microporous layer, and 21 wt. % to 60 wt. % in the second microporous layer, based on the combined weight of the polyethylene and polypropylene. The total amount of polyethylene in the film (i.e., both microporous layers) is 2 wt. % to 40 wt. %, based on the weight of the multi-layer microporous film.

JP10-195215A discloses a relatively thin battery separator having acceptable shutdown and pin-pulling characteristics. The term "pin pulling" refers to the relative ease of pulling a metal pin from a laminate of a separator, a cathode sheet and an anode sheet, which is wound around the pin, to form a toroidal laminate. The multi-layer, porous film contains polyethylene and polypropylene, but in different relative amounts. The percentage of polyethylene is 0 wt. % to 20 wt. % in the inner layer and 61 wt. % to 100 wt. % in the outer layer, based on the total weight of the polyethylene and polypropylene.

JP10-279718A discloses a separator designed to prevent unacceptably large temperature increases in a lithium battery when the battery is overcharged. The separator is formed from a multi-layer, porous film made of polyethylene and polypropylene, with different relative amounts of polyethylene and polypropylene in each layer. The film has a polyethylene-poor layer whose polyethylene content is 0 wt. % to 20 wt. %, based on the weight of the polyethylene-poor layer. The second layer is a polyethylene-rich layer which contains 0.5 wt. % or more of polyethylene having a melt index of 3 or more and has a polyethylene content of 61 wt. % to 100 wt. %, based on the weight of the polyethylene-rich layer.

It would be desirable to further improve the permeability, pin puncture strength, and shutdown speed of microporous polyolefin membranes. Moreover, it would be desirable to further improve the thickness uniformity of microporous polyolefin membranes in order to reduce the likelihood of short-circuiting when used as battery separators.

DISCLOSURE OF THE INVENTION

Accordingly, in an embodiment, the invention relates to a polyolefin in the form of a multi-layer, microporous polyolefin membrane having suitably well-balanced permeability, pin puncture strength, shutdown temperature, shutdown speed, meltdown temperature, and thickness uniformity. "Well balanced" in this context means that a particular property of the membrane (e.g., permeability) is not degraded to an undesirable value in order to improve another membrane property (e.g., thickness uniformity).

In another embodiment, the invention relates to a battery separator formed by such a multi-layer, microporous polyolefin membrane.

In another embodiment, the invention relates to a battery comprising such a separator. In yet another embodiment, the invention relates to the use of such a battery, e.g., as a power source for electrical and/or electronic equipment.

In other embodiments, the invention relates to a method for making the multi-layer, microporous polyolefin membrane, a method for making a battery using such a membrane as a separator, and a method for using such a battery.

In an embodiment, the invention relates to a polyolefin membrane or membrane precursor. A polyolefin membrane precursor is, e.g., a polyolefin composition, polyolefin solution, extrudate, gel-like sheet, stretched sheet, etc. that can be formed (or is in the process of being formed) into a polyolefin membrane. Accordingly, in one embodiment the invention relates to a multi-layer, microporous polyolefin membrane comprising:

a first microporous layer and a second microporous layer, wherein
(i) the first and second microporous layers contain polyethylene and polypropylene;
(ii) the first microporous layer contains polyethylene in a first amount of at least about 80 wt. %, based on the weight of the first microporous layer;
(iii) the second microporous layer contains polyethylene in a second amount of at least about 50 wt. %, based on the weight of the second microporous layer;
(iv) the amount of polyethylene in the first microporous layer is larger than the amount of polyethylene in the second microporous layer; and
(v) the amount of the polyethylene in the first microporous layer plus the amount of polyethylene in the second microporous layer is at least about 61 wt. %, based on the weight of the multi-layer, microporous polyolefin membrane.

Accordingly, in one embodiment, the invention relates to a multi-layer, microporous polyolefin membrane comprising a first microporous layer and a second microporous layer; wherein
(i) the first and second microporous layers contain polyethylene and polypropylene;
(ii) the polyethylene in the first microporous layer is present in an amount ranging from about 80 wt. % to about 99.5 wt. % based on the weight of the first microporous layer;
(iii) the polyethylene in the second microporous layer is present in an amount ranging from about 50 wt. % to about 85 wt. % based on the weight of the second microporous layer;
(iv) the amount of polyethylene in the first microporous layer is larger than the amount of polyethylene in the second microporous layer; and
(v) the amount of the polyethylene in the first microporous layer plus the amount of polyethylene in the second microporous layer (i.e., the total amount of polyethylene) ranges from about 61 wt. % to about 95 wt. %, based on the weight of the multi-layer, microporous polyolefin membrane.

In a related embodiment, the amount of polyethylene in the first microporous layer ranges from about 85 wt. % to about 99 wt. %, based on the weight of the first microporous layer; the amount of polyethylene in the second microporous layer ranges from about 60 wt. % to about 83 wt. %, based on the weight of the second microporous layer; the amount of polyethylene in the first microporous layer is at least about 5 wt. % larger than the amount of polyethylene in the second microporous layer; and the amount of polyethylene in the first microporous layer plus the amount of polyethylene in the second microporous layer (i.e., the total amount of polyethylene) ranges from about 70 wt. % to about 90 wt. %, based on the weight of the multi-layer, microporous polyolefin membrane.

In an embodiment, the multi-layer, microporous polyolefin membrane as described above comprises
(i) a first microporous layer comprising polypropylene, ultra-high-molecular-weight polyethylene having a weight-average molecular weight of at least about $1\times10^6$, and high density polyethylene having weight-average molecular weight in the range of about $1\times10^4$ to about $5\times10^5$, wherein the ultra-high-molecular-weight polyethylene is present in the first layer in an amount of not more than 15 wt. %, based on the weight of the first layer; and
(ii) a second microporous layer comprising the polypropylene and the high-density polyethylene.

The invention also relates to a battery separator formed by the multi-layer, microporous polyolefin membrane recited in any one of the preceding embodiments.

The invention also relates to a battery comprising a separator formed by the multi-layer, microporous polyolefin membrane recited in any of the preceding embodiments.

In related embodiments, the multi-layer, microporous polyolefin membrane can be characterized by the following independently-selected features, either alone or in combination:

(1)
(a) The amount of polyethylene in the first microporous layer ranges from about 85 wt. % to about 99 wt. %, based on the weight of the first microporous layer, and the amount of polyethylene in the second microporous layer ranges from about 60 wt. % to about 83 wt. %, based on the weight of the second microporous layer;
(b) the amount of polyethylene in the first microporous layer is at least about 5 wt. % larger than the amount of polyethylene in the second microporous layer; and
(c) the amount of polyethylene in the first microporous layer plus the amount of polyethylene in the second microporous layer (i.e., the total amount of the polyethylene in the first and second microporous layers) ranges from about 70 wt. % to about 90 wt. %, based on the weight of the multi-layer, microporous polyolefin membrane.

(2) The polyethylene in the first microporous layer has an Mw in the range of about $1\times10^4$ to about $1\times10^7$, or about $1\times10^5$ to about $5\times10^6$, or about $2\times10^5$ to about $3\times10^6$.

(3) The first microporous layer comprises a first polyethylene having an Mw ranging from about $1\times10^4$ to about $5\times10^5$ and a second polyethylene.

(4) The polyethylene in the first microporous layers consists essentially of (or consists of) the first polyethylene.

(5) The first polyethylene is selected from one or more of a high-density polyethylene, a medium-density polyethylene, a branched low-density polyethylene, or a linear low-density polyethylene.

(6) The first polyethylene is a high-density polyethylene having an Mw ranging from about $1\times10^5$ to about $5\times10^5$, or about $2\times10^5$ to about $4\times10^5$.

(7) The first polyethylene is at least one of (i) an ethylene homopolymer or (ii) a copolymer of ethylene and a third α-olefin selected from the group of propylene, butene-1, hexene-1.

(8) The second polyethylene is a polyethylene having an Mw of at least about $1\times10^6$.

(9) The second polyethylene is ultra-high-molecular-weight polyethylene.

(10) The second polyethylene is at least one of (i) an ethylene homopolymer or (ii) a copolymer of ethylene and a fourth α-olefin selected from the group of propylene, butene-1, hexene-1.

(11) The second polyethylene is present in the first microporous layer in an amount of not more than about 15 wt. %, based on the weight of the first microporous layer.

(12) The polyethylene in the first microporous layer has a molecular weight distribution ("Mw/Mn") ranging from about 5 to about 300, or about 5 to about 100, or about 5 to about 30.

(13) The first microporous layer contains polyethylene in an amount ranging from about 80 wt. % to about 99.5 wt. %, based on the weight of the first microporous layer.

(14) The first and second microporous layers comprise polypropylene, wherein the polypropylene is one or more of (i) a propylene homopolymer or (ii) a copolymer of propylene and a fifth olefin selected from one or more of α-olefins such as ethylene, butene-1, pentene-1, hexene-1,4-methylpentene-1, octene-1, vinyl acetate, methyl methacrylate, styrene, butadiene, 1,5-hexadiene, 1,7-octadiene and 1,9-decadiene.

(15) The polypropylene has an Mw ranging from about $1×10^4$ to about $4×10^6$, or about $3×10^5$ to about $3×10^6$.

(16) The polypropylene has an Mw/Mn ranging from about 1.01 to about 100, or about 1.1 to about 50. Optionally, the polypropylene has one or more of the following properties: the polypropylene is isotactic, the polypropylene has a heat of fusion of at least about 90 Joules/gram; and the polypropylene has a melting peak (second melt) of at least about 160° C.

(17) The second microporous layer comprises polyethylene having an Mw in the range of about $1×10^4$ to about $1×10^7$, or about $1×10^5$ to about $5×10^6$, or about $2×10^5$ to about $3×10^6$.

(18) The second microporous layer comprises the first polyethylene, wherein the first polyethylene has an Mw ranging from about $1×10^4$ to about $5×10^5$.

(19) The second microporous layer comprises polyethylene, wherein the polyethylene of the second microporous layer consists essentially of (or consists of) the first polyethylene.

(20) The polyethylene of the second microporous layer comprises the first polyethylene.

(21) The polyethylene of the second microporous layer comprises at least one high-density polyethylene having an Mw ranging from about $1×10^5$ to about $5×10^5$, or about $2×10^5$ to about $4×10^5$.

(22) The first polyethylene of the second microporous layer is selected from at least one of (i) an ethylene homopolymer or (ii) a copolymer of ethylene and a third α-olefin selected from the group of propylene, butene-1, hexene-1.

(23) The polyethylene of the second microporous layer comprises the first polyethylene and the second polyethylene, and wherein the second polyethylene has an Mw of about at least about $1×10^6$.

(24) The second polyethylene of the second microporous layer is an ultra-high-molecular-weight polyethylene.

(25) The second polyethylene of the second microporous layer is selected from at least one of (i) an ethylene homopolymer or (ii) a copolymer of ethylene and a fourth α-olefin selected from the group of propylene, butene-1, hexene-1.

(26) The second polyethylene is present in the second microporous layer in an amount of no more than about 15 wt. %, based on the weight of the second microporous layer.

(27) The polyethylene of the second microporous layer has a molecular weight distribution ("Mw/Mn") of about 5 to about 300, or about 5 to about 100, or about 5 to about 30.

(28) The multi-layer, microporous polyolefin membrane has one first microporous layer and one second microporous layer. The layers can be, e.g., at least about one micrometer thick.

(29) The multi-layer, microporous polyolefin membrane has at least three layers, with the membrane comprising the first microporous layer, the second microporous layer, and a third microporous layer having approximately the same composition as the first microporous layer, wherein the first and third microporous layers constitute outer or "skin" layers of the multi-layer, microporous polyolefin membrane, and the second microporous layer is an intermediate layer of the multi-layer, microporous polyolefin membrane which is located between and optionally in planar contact with the first and third layers of the multi-layer, microporous polyolefin membrane. In this embodiment, the first and third layers comprise the first layer material and the second layer comprises the second layer material.

(30) The multi-layer, microporous polyolefin membrane has at least three layers, with the membrane comprising the first microporous layer, the second microporous layer, and a third microporous layer having approximately the same composition as the first microporous layer, wherein the first and third microporous layers constitute outer or "skin" layers of the multi-layer, microporous polyolefin membrane, and the second microporous layer is an intermediate layer of the multi-layer, microporous polyolefin membrane which is located between and optionally in planar contact with the second and third layers of the multi-layer, microporous polyolefin membrane. In this embodiment, the first and third layers comprise the second layer material and the second layer comprises the first layer material.

(31) The multi-layer, microporous polyolefin membrane has a porosity of about 25% to about 80%.

(32) The multi-layer, microporous polyolefin membrane has an air permeability of about 20 seconds/100 cm$^3$ to about 400 seconds/100 cm$^3$ (referenced to an air permeability value for a microporous polyolefin membrane having a 20 μm thickness).

(33) The multi-layer, microporous polyolefin membrane has a pin puncture strength of at least about 2,000 mN/20 μm.

(34) The multi-layer, microporous polyolefin membrane has a tensile strength of at least about 49,000 kPa.

(35) The multi-layer, microporous polyolefin membrane has a tensile elongation of at least about 100%.

(36) The multi-layer, microporous polyolefin membrane has a heat shrinkage ratio of about 12% or less in the machine and transverse directions as measured after the microporous polyolefin membrane has been held at a temperature of about 105° C. for 8 hours.

(37) The multi-layer, microporous polyolefin membrane has a thickness variation ratio that does not exceed about 15%.

(38) The multi-layer, microporous polyolefin membrane has a shutdown temperature of about 140° C. or lower.

(39) The multi-layer, microporous polyolefin membrane has a meltdown temperature of at least about 150° C.

(40) The multi-layer, microporous polyolefin membrane has a shutdown speed that does not exceed about 10 seconds.

BRIEF DESCRIPTION OF THE DRAWING

FIG. 1 is a schematic view showing a method for measuring a meltdown temperature.

DETAILED DESCRIPTION OF THE INVENTION

[1] Composition and Structure of the Multi-Layer, Microporous Polyolefin Membrane In an embodiment, the multi-layer, microporous polyolefin membrane comprises two layers. The first layer (e.g., the upper layer) comprises a first microporous layer material, and the second layer (e.g., the bottom layer) comprises a second microporous layer material. For example, the membrane has a planar top layer when viewed from above on an axis approximately perpendicular to the transverse and machine directions of the membrane, with the bottom planar layer hidden from view by the top layer. In another embodiment, the multi-layer, microporous polyolefin membrane comprises three or more layers, wherein the outer layers (also called the "surface" or "skin" layers) comprise the first microporous layer material and at least one intermediate layer comprises the second microporous layer material. In a related embodiment, where the multi-layer, microporous polyolefin membrane comprises two layers, the first layer consists essentially of (or consists of) the first microporous layer material and the second layer consists essentially of (or consists of) the second microporous layer material. In a related embodiment where the multi-layer, microporous polyolefin membrane comprises three or more layers, the outer layers consist essentially of (or consists of) the first microporous layer material and at least one intermediate layer consists essentially of (or consists of) the second microporous layer material. The membrane is referred to as a "polyolefin membrane" because the membrane contains polyolefin. While the membrane can contain polyolefin only, this is not required, and it is within the scope of the invention for the membrane to contain polyolefin and materials that are not polyolefin.

In yet another embodiment where the multi-layer, microporous polyolefin membrane comprises three or more layers, the surface layers comprise (or consist essentially of, or consist of) the second microporous layer material and at least one intermediate layer comprises (or consists essentially of, or consists of) the first microporous layer material.

When the multi-layer, microporous polyolefin membrane has three or more layers, the multi-layer, microporous polyolefin membrane has at least one layer comprising the first microporous layer material and at least one layer comprising the second microporous layer material.

The first and second microporous layer materials contain polyethylene and polypropylene. The first microporous layer material contains a greater amount of polyethylene than the second microporous layer material, and the total amount of polyethylene in the multi-layer, microporous polyolefin membrane is at least 61 wt. % based on the weight of the multi-layer, microporous polyolefin membrane. Optionally, the total amount of polyethylene in the multi-layer, microporous polyolefin membrane ranges from about 61 wt. % to about 95 wt. %, or about 70 wt. % to about 90 wt. %, based on the weight of the multi-layer, microporous polyolefin membrane. The amount of polyethylene in the first microporous layer material is at least about 80 wt. % based on the weight of the first microporous layer material. Optionally, the amount of polyethylene in the first microporous layer material ranges from about 80 wt. % to about 99.5 wt. %, based on the weight of the first microporous layer material. The amount of polyethylene in the second microporous layer material is at least about 50 wt. %, based on the weight of the second microporous layer material. Optionally, the amount of polyethylene in the second layer material ranges from about 50 wt. % to about 85 wt. %, based on the weight of the second microporous layer material.

In an embodiment, the first microporous layer material contains an amount of polyethylene ranging from about 85 wt. % to about 99 wt. %, based on the weight of the first microporous layer material. The second microporous layer material contains an amount of polyethylene ranging from about 60 wt. % to about 83 wt. %, based on the weight of the second microporous layer material. In this embodiment, the first microporous layer material contains an amount of polyethylene that is at least about 5 wt. % (based on the weight of the first microporous layer material) greater than the amount of polyethylene in the second microporous layer material. In other words, the weight percentage of polyethylene in the first microporous layer material, based on the weight of the first microporous layer material, exceeds the weight percentage of polyethylene in the second microporous layer material, based on the weight of the second layer material, by at least 5 wt. %.

In an embodiment, the first microporous layer material comprises at least about 85 wt. % of the first polyethylene and no more than about 15 wt. % of the second polyethylene, based on the weight of the first microporous layer material. The first polyethylene can be, e.g., a high density polyethylene ("HDPE"), and the second polyethylene can be, e.g., ultra-high-molecular weight polyethylene ("UHMWPE"). Optionally, the polyethylene in the first microporous layer material comprises at least about 91 wt. % of the first polyethylene with the balance of the polyethylene being the second polyethylene, based on the weight of the first microporous layer material. In yet another embodiment, the amount of the first polyethylene in the first microporous layer material ranges from about 94 wt. % to about 97 wt. % while the amount of second polyethylene in the first microporous layer material ranges from about 6 wt. % to about 3 wt. %, based on the weight of the first microporous layer material.

In an embodiment, the second microporous layer material comprises the first polyethylene. In another embodiment, the polyethylene in the second microporous layer material consists essentially of (or consists of) the first polyethylene. In other words, in this embodiment the second microporous layer material contains the first polyethylene only (e.g., HDPE only). In another embodiment, the second microporous layer material comprises the first polyethylene and the second polyethylene. For example, in one embodiment the second microporous layer material comprises no more than about 15 wt. % of the UHMWPE and at least about 85 wt. % of the HDPE, based on the weight of the second microporous layer material. In related embodiments, the amount of the ultra-high-molecular-weight polyethylene in the second microporous layer material is no more than about 9 wt. %, or no more than about 6 wt. %, based on the weight of the second microporous layer material.

For example, in one embodiment the multi-layer, microporous polyolefin membrane comprises first and second microporous layer materials wherein the polyethylene in the first microporous layer material comprises 10 wt. % or less of ultra-high-molecular-weight polyethylene (UHMWPE) having a weight-average molecular weight of about $1 \times 10^6$ or more, and 90 wt. % or more of high-density polyethylene having a weight-average molecular weight of about $1 \times 10^4$ to about $5 \times 10^5$, and wherein the polyethylene in the second microporous layer material is the high-density polyethylene (HDPE).

The first and second polyethylene and the polypropylene will now be described in more detail.

A. The First Polyethylene

In an embodiment, the first polyethylene is a polyethylene having an Mw of less than $1 \times 10^6$, for example a polyethylene having an Mw ranging from about $1 \times 10^4$ to about $5 \times 10^5$. Optionally, the first polyethylene can be one or more of an HDPE, a medium-density polyethylene, a branched low-density polyethylene, or a linear low-density polyethylene. Although it is not critical, the Mw of high-density polyethylene can range, for example, from about $1 \times 10^5$ to about $5 \times 10^5$, or from about $2 \times 10^5$ to about $4 \times 10^5$. In an embodiment, the first polyethylene is at least one of (i) an ethylene homopolymer or (ii) a copolymer of ethylene and a third α-olefin such as propylene, butene-1, hexene-1, etc, typically in a relatively small amount compared to the amount of ethylene. Such a copolymer can be produced using a single-site catalyst.

B. The Second Polyethylene

In an embodiment, the second polyethylene is a polyethylene having an Mw of at least about $1 \times 10^6$. For example, the second polyethylene can be an UHMWPE. In an embodiment, the second polyethylene is at least one of (i) an ethylene homopolymer or (ii) a copolymer of ethylene and a fourth α-olefin which is typically present in a relatively small amount compared to the amount of ethylene. The fourth α-olefin can be, for example, one or more of propylene, butene-1, pentene-1, hexene-1,4-methylpentene-1, octene-1, vinyl acetate, methyl methacrylate, or styrene. Although it is not critical, the Mw of the second polyethylene can range from about $1\times10^6$ to about $15\times10^6$, or from about $1\times10^6$ to about $5\times10^6$, or from about $1\times10^6$ to about $3\times10^6$.

C. The Polypropylene

Besides polyethylene, the first and second microporous layer materials comprise polypropylene. The polypropylene can be, for example, one or more of (i) a propylene homopolymer or (ii) a copolymer of propylene and a fifth olefin. The copolymer can be a random or block copolymer. The fifth olefin can be, e.g., one or more of α-olefins such as ethylene, butene-1, pentene-1, hexene-1,4-methylpentene-1, octene-1, vinyl acetate, methyl methacrylate, and styrene, etc.; and diolefins such as butadiene, 1,5-hexadiene, 1,7-octadiene, 1,9-decadiene, etc. The amount of the fifth olefin in the copolymer is preferably in a range that does not adversely affect properties of the multi-layer, microporous membrane such as heat resistance, compression resistance, heat shrinkage resistance, etc. For example, the amount of the fifth olefin can be less than 10% by mol based on 100% by mol of the entire copolymer. Optionally, the polypropylene has one or more of the following properties: (i) the polypropylene has an Mw ranging from about $1\times10^4$ to about $4\times10^6$, or about $3\times10^5$ to about $3\times10^6$; (ii) the polypropylene has an Mw/Mn ranging from about 1.01 to about 100, or about 1.1 to about 50; (iii) the polypropylene's tacticity is isotactic; (iv) the polypropylene has a heat of fusion of at least about 90 Joules/gram; (v) polypropylene has a melting peak (second melt) of at least about 160° C., (vi) the polypropylene has a Trouton's ratio of at least about 15 when measured at a temperature of about 230° C. and a strain rate of 25 $\text{sec}^{-1}$; and/or (vii) the polypropylene has an elongational viscosity of at least about 50,000 Pa sec at a temperature of 230° C. and a strain rate of 25 $\text{sec}^{-1}$.

The composition of the first and second layer materials and the membrane will now be described in more detail. In one embodiment, the polyethylene in the first microporous layer material can have one or more of the following independently-selected features:

(1) The polyethylene has an Mw in the range of about $1\times10^4$ to about $1\times10^7$, or about $1\times10^5$ to about $5\times10^6$, or about $2\times10^5$ to about $3\times10^6$.

(2) The polyethylene comprises the first polyethylene having an Mw ranging from about $1\times10^4$ to about $5\times10^5$.

(3) The polyethylene consists essentially of, or consists of, the first polyethylene.

(4) The first polyethylene is one or more of a high-density polyethylene, a medium-density polyethylene, a branched low-density polyethylene, or a linear low-density polyethylene.

(5) The first polyethylene is one or more of a high-density polyethylene having an Mw ranging from about $1\times10^5$ to about $5\times10^5$, or from about $2\times10^5$ to about $4\times10^5$.

(6) The first polyethylene is at least one of (i) an ethylene homopolymer or (ii) a copolymer of ethylene and a third α-olefin selected from the group of propylene, butene-1, hexene-1.

(7) The polyethylene comprises the first polyethylene and the second polyethylene, wherein the second polyethylene has an Mw of about $1\times10^6$ or more.

(8) The second polyethylene has an Mw ranging from about $1\times10^6$ to about $15\times10^6$, or optionally from about $1\times10^6$ to about $5\times10^6$, or optionally from about $1\times10^6$ to about $3\times10^6$.

(9) The second polyethylene is ultra-high-molecular-weight polyethylene.

(10) The second polyethylene is at least one of (i) an ethylene homopolymer or (ii) a copolymer of ethylene and a fourth α-olefin selected from the group of propylene, butene-1, hexene-1.

(11) The amount of the second polyethylene in the first microporous layer material is no more than about 15 wt. %, based on the weight of the first microporous layer material.

(12) The polyethylene has a molecular weight distribution ("Mw/Mn") of about 5 to about 300, or about 5 to about 100, or optionally from about 5 to about 30.

(13) The amount of polyethylene in the first microporous layer material ranges from about 80 wt. % to about 99.5 wt. %, based on the weight of the first microporous layer material.

By way of example, the polypropylene in either the first or the second microporous layer material can have one or more of the following independently-selected features:

(14) The polypropylene is one or more of (i) a propylene homopolymer or (ii) a copolymer of propylene and a fifth olefin selected from one or more α-olefins such as ethylene, butene-1, pentene-1, hexene-1,4-methylpentene-1, octene-1, vinyl acetate, methyl methacrylate, styrene, butadiene, 1,5-hexadiene, 1,7-octadiene and 1,9-decadiene.

(15) The polypropylene has an Mw ranging from about $1\times10^4$ to about $4\times10^6$, or from about $3\times10^5$ to about $3\times10^6$.

(16) The polypropylene has an Mw/Mn ranging from about 1.01 to about 100, or from about 1.1 to about 50.

By way of example, the polyethylene in the second microporous layer material can have one or more of the following independently-selected features:

(17) The polyethylene has an Mw in the range of about $1\times10^4$ to about $1\times10^7$, or about $1\times10^5$ to about $5\times10^6$, or about $2\times10^5$ to about $3\times10^6$.

(18) The polyethylene comprises a first polyethylene having an Mw ranging from about $1\times10^4$ to about $5\times10^5$.

(19) The polyethylene consists essentially of, or consists of, the first polyethylene.

(20) The first polyethylene is one or more of a high-density polyethylene, a medium-density polyethylene, a branched low-density polyethylene, or a linear low-density polyethylene.

(21) The first polyethylene is one or more of a high-density polyethylene having an Mw ranging from about $1\times10^5$ to about $5\times10^5$, or from about $2\times10^5$ to about $4\times10^5$.

(22) The first polyethylene is at least one of (i) an ethylene homopolymer or (ii) a copolymer of ethylene and a third α-olefin selected from the group of propylene, butene-1, and hexene-1.

(23) The polyethylene comprises the first polyethylene and the second polyethylene, wherein the second polyethylene has an Mw of about $1\times10^6$ or more.

(24) The second polyethylene has an Mw ranging from about $1\times10^6$ to about $15\times10^6$, or optionally from about $1\times10^6$ to about $5\times10^6$, or optionally from about $1\times10^6$ to about $3\times10^6$.

(25) The second polyethylene is ultra-high-molecular-weight polyethylene.

(26) The second polyethylene is at least one of (i) an ethylene homopolymer or (ii) a copolymer of ethylene and a fourth α-olefin selected from the group of propylene, butene-1, and hexene-1.

(27) The amount of the second polyethylene in the second microporous layer material is no more than about 15 wt. %, or no more than about 9 wt. %, or no more than about 6 wt. %, based on the weight of the second microporous layer material.

(28) The polyethylene has a molecular weight distribution ("Mw/Mn") of about 5 to about 300, or about 5 to about 100, or optionally from about 5 to about 30.

(29) The amount of polyethylene in the second microporous layer material ranges from about 60 wt. % to about 83 wt. %, or from about 65 wt. % to about 80 wt. %, based on the weight of the second microporous layer material.

[2] Materials Used to Produce the Multi-Layer, Microporous Polyolefin Membrane

A. Polymer Resins Used to Make the First Microporous Layer Material

In an embodiment, the first microporous layer material is made from a first polyolefin solution. The first polyolefin solution comprises a first polyolefin composition and a first process solvent. Since the process produces a multi-layer, microporous polyolefin membrane, the process solvent is also referred to as a diluent or a membrane-forming solvent. The first polyolefin composition comprises a first polyethylene resin and a first polypropylene resin. The amount of the first polyethylene resin in the first polyolefin composition is at least about 80 wt. %, based on the weight of the first polyolefin composition. The resins used to make the first polyolefin composition will now be described in more detail.

(1) The First Polyethylene Resin

In an embodiment, the first polyethylene resin comprises the first polyethylene, where the first polyethylene is as described above in section [1]. In another embodiment, the first polyethylene resin comprises the first and the second polyethylene, where the second polyethylene is as described above in section [1]. For example, the first polyethylene resin can be a mixture of a polyethylene resin having a lower Mw than UHMWPE (such as HDPE) and UHMWPE resin. Although it is not critical, the Mw of the first polyethylene resin can be, for example, in the range of about $1\times10^4$ to about $1\times10^7$, or about $1\times10^5$ to about $5\times10^6$, or about $2\times10^5$ to about $3\times10^6$. When present, the amount of UHMWPE in the first polyethylene resin generally does not exceed about 15 wt. %, or optionally does not exceed about 9 wt. %, based the weight of the first polyethylene resin. For example, the amount of UHMWPE in the first polyethylene resin can range from about 3 wt. % to about 6 wt. %, based on the weight of the first polyethylene resin.

The molecular weight distribution (Mw/Mn") of the polyethylene in the first polyethylene resin is not critical. Mw/Mn is a measure of a molecular weight distribution; the larger this value, the wider the molecular weight distribution. Though not critical, the Mw/Mn of the polyethylene in the first polyethylene resin can range from about 5 to about 300, or from about 5 to about 100, or from about 5 to about 30. When the Mw/Mn is less than 5, it can be more difficult to extrude the first polyethylene resin. On the other hand, when the Mw/Mn is more than 300, it can be more difficult to produce a relatively strong multi-layer, microporous membrane. Multi-stage polymerization can be used to obtain the desired Mw/Mn ratio in the first polyethylene resin. For example, a two-stage polymerization method can be used, forming a relatively high-molecular-weight polymer component in the first stage, and forming a relatively low-molecular-weight polymer component in the second stage. While not required, this method can be used, for example, when the first polyethylene resin comprises the first polyethylene. When the first polyethylene resin comprises the first polyethylene and the second polyethylene, the desired Mw/Mn ratio of the polyethylene resin can be selected by adjusting the relative molecular weights and relative amounts of the first and second polyethylene.

(2) The First Polypropylene Resin

Besides the first polyethylene resin, the first polyolefin composition further comprises a first polypropylene resin. The first polypropylene resin can be, for example, one or more of (i) a propylene homopolymer or (ii) a copolymer of propylene and a fifth olefin. The copolymer can be a random or block copolymer. The fifth olefin can be, e.g., one or more α-olefins such as ethylene, butene-1, pentene-1, hexene-1,4-methylpentene-1, octene-1, vinyl acetate, methyl methacrylate, and styrene, etc.; and diolefins such as butadiene, 1,5-hexadiene, 1,7-octadiene, 1,9-decadiene, etc. The amount of the fifth olefin in the copolymer should be in a range that does not adversely affect properties of the resulting multi-layer, microporous membrane such as heat resistance, compression resistance, heat shrinkage resistance, etc. For example, the amount of the fifth olefin can be less than 10% by mol based on 100% by mol of the entire copolymer.

While it is not critical, the Mw of the polypropylene in the first polypropylene resin can range from about $1\times10^4$ to about $4\times10^6$, or from about $3\times10^5$ to about $3\times10^6$. While it is not critical, the molecular weight distribution (Mw/Mn) of the polypropylene in the first polypropylene resin can range from about 1.01 to about 100, or from about 1.1 to about 50.

(3) Formulation

In an embodiment, the amount of the first polyethylene resin in the first polyolefin composition ranges from about 80 wt. % to about 99.5 wt. % based on the weight of the first polyolefin composition. When the amount of first polyethylene resin is less than about 80 wt. %, it can be more difficult to produce a multi-layer, microporous polyolefin membrane having a relatively low shutdown temperature and a relatively fast shutdown speed. When the amount of first polyethylene resin is more than 99.5 wt. %, it can be more difficult to produce a multi-layer, microporous polyolefin membrane having a relatively high meltdown temperature. In an embodiment, the amount of the first polyethylene resin in the first polyolefin composition ranges from about 85 wt. % to about 99 wt. %, or from about 87 wt. % to about 98 wt. %, based on the weight of the first polyolefin solution.

B. Polymer Resins Used to Produce the Second Microporous Layer Material

In an embodiment, the second microporous layer material is made from a second polyolefin solution that is generally selected independently of the first polyolefin solution. The second polyolefin solution comprises a second polyolefin composition and a second process solvent which can be the same as the first process solvent. As is the case in the first polyolefin solution, the second process solvent can be referred to as a second membrane-forming solvent or a second diluent. In an embodiment, the second polyolefin composition comprises a second polyethylene resin and a second polypropylene resin. For example, the amount of the second polyethylene resin in the second polyolefin composition can range from about 50 wt. % to about 85 wt. %, based on the weight of the second polyolefin composition. When the amount of the second polyethylene resin in the second polyolefin composition is less than about 50 wt. %, it can be more difficult to form a multi-layer, microporous polyolefin membrane having a relatively high permeability. When the amount of the second polyethylene resin in the second polyolefin composition is more than about 85 wt. %, it can be more difficult to produce a multi-layer, microporous polyolefin membrane having a relatively high meltdown temperature. In an embodiment, the amount of the second polyethylene resin in the second polyolefin composition ranges from about 60 wt. % to about 83 wt. %, or about 65 wt. % to about 80 wt. %, based on the weight of the second polyolefin composition.

The second polyethylene resin can, e.g., comprise (i) the first polyethylene or (ii) the first polyethylene and the second polyethylene. While the second polyethylene resin can contain the same materials in the same amounts as in the first polyethylene resin, this need not be the case because the second polyethylene resin is generally selected independently of the first polyethylene resin. Similarly, the second polypropylene resin can contain the same materials in the same amounts as in the first polypropylene resin. While the second polypropylene resin can be the same as the first polypropylene resin, this need not be the case because the second polypropylene resin is generally selected independently of the first polypropylene resin.

While not wishing to be bound by any theory or model, it is believed that when the first and/or second polyethylene resins contain the first polyethylene only (e.g., HDPE but no UHM-WPE), it is less difficult to produce a multi-layer, microporous polyolefin membrane of uniform thickness. In an embodiment where the second polyethylene resin comprises the first polyethylene and the second polyethylene, the amount of the second polyethylene in the second polyethylene resin is optionally about 15 wt. % or less, or about 9 wt. % or less, or about 6 wt. % or less, based on the weight of the second polyethylene resin.

C. Third Polyolefin

Although it is not required, each of the first and second polyolefin compositions can further comprise a third polyolefin selected from the group consisting of polybutene-1, polypentene-1, poly-4-methylpentene-1, polyhexene-1, polyoctene-1, polyvinyl acetate, polymethyl methacrylate, polystyrene and an ethylene .α-olefin copolymer (except for an ethylene-propylene copolymer). In an embodiment where a third polyolefin is used, the third polyolefin can, for example, have an Mw in the range of about $1 \times 10^4$ to about $4 \times 10^6$. In addition to or besides the third polyolefin, the first and/or second polyolefin composition can further comprise a polyethylene wax, e.g., one having an Mw in the range of about $1 \times 10^3$ to about $1 \times 10^4$. When used, these species should be present in amounts less than an amount that would cause deterioration in the desired properties (e.g., meltdown, shutdown, etc.) of the multi-layer, microporous membrane. When the third polyolefin is one or more of polybutene-1, polypentene-1, poly-4-methylpentene-1, polyhexene-1, polyoctene-1, polyvinyl acetate, polymethyl methacrylate, and polystyrene, the third polyolefin need not be a homopolymer, but may be a copolymer containing other α-olefins.

D. The Amount of Polyethylene Resin Used in the First and Second Polyolefin Compositions Since the first microporous layer material in the multi-layer, microporous polyolefin membrane should have a higher polyethylene concentration than the second microporous layer material, the first polyolefin solution generally has a higher polyethylene concentration than the second polyolefin solution. Therefore, in an embodiment, the first polyolefin composition generally has a higher polyethylene concentration than the second polyolefin composition, particularly when the concentration of first membrane-forming solvent in the first polyolefin solution is approximately the same as the concentration of second membrane-forming solvent in the second polyolefin solution. When the relative amount of polyethylene resin used in the first polyolefin composition is equal to or less than the relative amount used in the second polyolefin composition, it can be more difficult to produce a multi-layer, microporous polyolefin membrane having suitably well-balanced shutdown temperature, shutdown speed, and meltdown temperature. In an embodiment, the relative amount of polyethylene resin used in the first polyolefin composition exceeds the relative amount of polyethylene resin in the second polyolefin composition by at least about 5 wt. %, or at least about 8 wt. %, based on the weight of the first polyolefin composition.

E. The Total Amount of Polyethylene Resin Used to Produce the Multi-Layer, Microporous Polyolefin Membrane In an embodiment, the total amount of polyethylene resin used to make the multi-layer, microporous polyolefin membrane is at least about 61 wt. % based on the combined weight of the first and second polyethylene resins, or alternatively about 61 wt. %, based on the weight of the multi-layer, microporous polyolefin membrane. When the total amount of polyethylene used is less than about 61 wt. %, it can be more difficult to produce a multi-layer, microporous polyolefin membrane having a relatively low shutdown temperature and a relatively fast shutdown speed. When the total amount of polyethylene used is more than about 95 wt. %, it is more difficult to produce a multi-layer, microporous polyolefin membrane having a relatively high meltdown temperature. In an embodiment, the total amount of polyethylene used to make the multi-layer, microporous polyolefin membrane ranges from about 70 wt. % to about 90 wt. %, or about 80 wt. % to about 90 wt. %, based on the weight of the multi-layer, microporous polyolefin membrane.

The multi-layer, microporous membrane generally comprises the polyolefin used to form the polyolefin solution. A small amount of washing solvent and/or process solvent can also be present, generally in amounts less than 1 wt % based on the weight of the microporous polyolefin membrane. A small amount of polyolefin molecular weight degradation might occur during processing, but this is acceptable. In an embodiment, molecular weight degradation during processing, if any, causes the value of Mw/Mn of the polyolefin in the membrane to differ from the Mw/Mn of the polyolefin solution by no more than about 50%, or no more than about 1%, or no more than about 0.1%.

[3] Production Method of Multi-Layer, Microporous Polyolefin Membrane

In an embodiment, the microporous polyolefin membrane is a two-layer membrane. In another embodiment, the microporous polyolefin membrane has at least three layers. For the sake of brevity, the production of the microporous polyolefin membrane will be mainly described in terms of two-layer and three-layer membranes, although those skilled in the art will recognize that the same techniques can be applied to the production of membranes or membranes having at least four layers.

In an embodiment, the three-layer microporous polyolefin membrane comprises first and third microporous layers constituting the outer layers of the microporous polyolefin membrane and a second layer situated between (and optionally in planar contact with) the first and third layers. In an embodiment, the first and third layers are produced from the first polyolefin solution and the second (or inner) layer is produced from the second polyolefin solution. In another embodiment, the first and third layers are produced from the second polyolefin solution and the second layer is produced from the first polyolefin solution.

The order and polyethylene content of the layers is not particularly critical, so long as the total amount of the polyethylene resin to make the multi-layer, microporous polyolefin membrane is about 61 wt. % to about 95 wt. %, based on the weight of the multi-layer, microporous polyolefin membrane.

A. First Production Method

The first method for producing a multi-layer, microporous polyolefin membrane comprises the steps of (1) combining (e.g., by melt-blending) a first polyolefin composition and a membrane-forming solvent to prepare a first polyolefin solution, (2) combining a second polyolefin composition and a second membrane-forming solvent to prepare a second polyolefin solution, (3) extruding (preferably simultaneously) the first and second polyolefin solutions through at least one die to form an extrudate, (4) cooling the extrudate to form a cooled extrudate, i.e., a multi-layer, gel-like sheet, (5) removing the membrane-forming solvent from the multi-layer, gel-like sheet to form a solvent-removed gel-like sheet, and (6) drying the solvent-removed gel-like sheet in order to form the multi-layer, microporous polyolefin membrane. An optional stretching step (7), and an optional hot solvent treatment step (8), etc. can be conducted between steps (4) and (5), if desired. After step (6), an optional step (9) of stretching a multi-layer, microporous membrane, an optional heat treatment step (10), an optional cross-linking step with ionizing radiation (11), and an optional hydrophilic treatment step (12), etc., can be conducted if desired. The order of the optional steps is not critical.

(1) Preparation of First Polyolefin Solution

The first polyolefin composition comprises polyolefin resins as described above that can be combined, e.g., by dry mixing or melt blending with an appropriate membrane-forming solvent to produce the first polyolefin solution. Optionally, the first polyolefin solution can contain various additives such as one or more antioxidant, fine silicate powder (pore-forming material), etc., provided these are used in a concentration range that does not significantly degrade the desired properties of the multi-layer, microporous polyolefin membrane.

The first membrane-forming solvent is preferably a solvent that is liquid at room temperature. While not wishing to be bound by any theory or model, it is believed that the use of a liquid solvent to form the first polyolefin solution makes it possible to conduct stretching of the gel-like sheet at a relatively high stretching magnification. In an embodiment, the first membrane-forming solvent can be at least one of aliphatic, alicyclic or aromatic hydrocarbons such as nonane, decane, decalin, p-xylene, undecane, dodecane, liquid paraffin, etc.; mineral oil distillates having boiling points comparable to those of the above hydrocarbons; and phthalates liquid at room temperature such as dibutyl phthalate, dioctyl phthalate, etc. In an embodiment where it is desired to obtain a multi-layer, gel-like sheet having a stable liquid solvent content, non-volatile liquid solvents such as liquid paraffin can be used, either alone or in combination with other solvents. Optionally, a solvent which is miscible with polyethylene in a melt blended state but solid at room temperature can be used, either alone or in combination with a liquid solvent. Such solid solvent can include, e.g., stearyl alcohol, ceryl alcohol, paraffin waxes, etc. Although it is not critical, it can be more difficult to evenly stretch the gel-like sheet or resulting membrane when the solution contains no liquid solvent.

The viscosity of the liquid solvent is not a critical parameter. For example, the viscosity of the liquid solvent can range from about 30 cSt to about 500 cSt, or from about 30 cSt to about 200 cSt, at 25° C. Although it is not a critical parameter, when the viscosity at 25° C. is less than about 30 cSt, it can be more difficult to prevent foaming the polyolefin solution, which can lead to difficulty in blending. On the other hand, when the viscosity is greater than about 500 cSt, it can be more difficult to remove the liquid solvent from the multi-layer, microporous polyolefin membrane.

In an embodiment, the resins, etc., used to produce to the first polyolefin composition are melt-blended in, e.g., a double screw extruder or mixer. For example, a conventional extruder (or mixer or mixer-extruder) such as a double-screw extruder can be used to combine the resins, etc., to form the first polyolefin composition. The membrane-forming solvent can be added to the polyolefin composition (or alternatively to the resins used to produce the polyolefin composition) at any convenient point in the process. For example, in an embodiment where the first polyolefin composition and the first membrane-forming solvent are melt-blended, the solvent can be added to the polyolefin composition (or its components) at any of (i) before starting melt-blending, (ii) during melt blending of the first polyolefin composition, or (iii) after melt-blending, e.g., by supplying the first membrane-forming solvent to the melt-blended or partially melt-blended polyolefin composition in a second extruder or extruder zone located downstream of the extruder zone used to melt-blend the polyolefin composition.

When melt-blending is used, the melt-blending temperature is not critical. For example, the melt-blending temperature of the first polyolefin solution can range from about 10° C. higher than the melting point $Tm_1$ of the first polyethylene resin to about 120° C. higher than $Tm_1$. For brevity, such a range can be represented as $Tm_1+10°$ C. to $Tm_1+120°$ C. In an embodiment where the first polyethylene resin has a melting point of about 130° C. to about 140° C., the melt-blending temperature can be in the range of from about 140° C. to about 250° C., or from about 170° C. to about 240° C.

When an extruder such as a double-screw extruder is used for melt-blending, the screw parameters are not critical. For example, the screw can be characterized by a ratio L/D of the screw length L to the screw diameter D in the double-screw extruder, which can range, for example, from about 20 to about 100, or from about 35 to about 70. Although this parameter is not critical, when L/D is less than about 20, melt-blending can be more difficult, and when L/D is more than about 100, faster extruder speeds might be needed to prevent excessive residence time of the polyolefin solution in the double-screw extruder (which can lead to undesirable molecular weight degradation). Although it is not a critical parameter, the cylinder (or bore) of the double-screw extruder can have an inner diameter of in the range of about 40 mm to about 100 mm, for example.

The amount of the first polyolefin composition in the first polyolefin solution is not critical. In an embodiment, the amount of first polyolefin composition in the first polyolefin solution can range from about 1 wt. % to about 75 wt. %, based on the weight of the polyolefin solution, for example from about 20 wt. % to about 70 wt. %. Although the amount of first polyolefin composition in the first polyolefin solution is not critical, when the amount is less than about 1 wt. %, it can be more difficult to produce the multi-layer, microporous polyolefin membrane at an acceptably efficient rate. Moreover, when the amount is less than 1 wt. %, it can be more difficult to prevent swelling or neck-in at the die exit during extrusion, which can make it more difficult to form and support the multi-layer, gel-like sheet, which is a precursor of the membrane formed during the manufacturing process. On the other hand, when the amount of first polyolefin composition solution is greater than about 75 wt. %, it can be more difficult to form the multi-layer, gel-like sheet.

(2) Preparation of Second Polyolefin Solution

The second polyolefin solution can be prepared by the same methods used to prepare the first polyolefin solution. For example, the second polyolefin solution can be prepared by melt-blending a second polyolefin composition with a second membrane-forming solvent. The second membrane-forming solvent can be selected from among the same solvents as the first membrane-forming solvent. And while the second membrane-forming solvent can be (and generally is) selected independently of the first membrane-forming solvent, the second membrane-forming solvent can be the same as the first membrane-forming solvent, and can be used in the same relative concentration as the first membrane-forming solvent is used in the first polyolefin solution.

The second polyolefin composition is generally selected independently of the first polyolefin composition. The second polyolefin composition comprises a second polyethylene resin which can comprise the same resins, etc. (e.g., the same polyethylene resin or resins and the same polypropylene resin or resins), as the first polyolefin composition. Since the first and second microporous layer materials generally do not have the same composition, the resins and the relative amounts of second polyethylene resin (or resins) and second polypropylene resin (or resins) used to produce the second polyolefin composition can be and generally are different from the relative amounts of the first polyethylene resin (or resins) and the first polypropylene resin or resins used to produce the first polyolefin composition.

Although it is not a critical parameter, the melt-blending conditions for the second polyolefin solution can differ from the conditions described for producing the first polyolefin composition in that the melt-blending temperature of the second polyolefin solution can range from about the melting point $Tm_2$ of the second polyethylene resin+10° C. to $Tm_2$+120° C.

(3) Extrusion

In an embodiment, the first polyolefin solution is conducted from a first extruder to a first die and the second polyolefin solution is conducted from a second extruder to a second die. A layered extrudate in sheet form (i.e., a body significantly larger in the planar directions than in the thickness direction) can be extruded from the first and second die. Optionally, the first and second polyolefin solutions are co-extruded from the first and second die with a planar surface of a first extrudate layer formed from the first polyolefin solution in contact with a planar surface of a second extrudate layer formed from the second polyolefin solution. A planar surface of the extrudate can be defined by a first vector in the machine direction (MD) of the extrudate and a second vector in the transverse direction (TD) of the extrudate.

In an embodiment, a die assembly is used where the die assembly comprises the first and second die, as for example when the first die and the second die share a common partition between a region in the die assembly containing the first polyolefin solution and a second region in the die assembly containing the second polyolefin solution.

In another embodiment, a plurality of dies is used, with each die connected to an extruder for conducting either the first or second polyolefin solution to the die. For example, in one embodiment, the first extruder containing the first polyolefin solution is connected to a first die and a third die, and a second extruder containing the second polyolefin solution is connected to a second die. As is the case in the preceding embodiment, the resulting layered extrudate can be co-extruded from the first, second, and third die (e.g., simultaneously) to form a three-layer extrudate comprising a first and a third layer constituting surface layers (e.g., top and bottom layers) produced from the first polyolefin solution; and a second layer constituting a middle or intermediate layer of the extrudate situated between and in planar contact with both surface layers, where the second layer is produced from the second polyolefin solution.

In yet another embodiment, the same die assembly is used but with the polyolefin solutions reversed, i.e., the second extruder containing the second polyolefin solution is connected to the first die and the third die, and the first extruder containing the first polyolefin solution is connected to the second die.

In any of the preceding embodiments, die extrusion can be conducted using conventional die extrusion equipment. For example, extrusion can be conducted by a flat die or an inflation die. In one embodiment useful for co-extrusion of multi-layer, gel-like sheets, multi-manifold extrusion can be used, in which the first and second polyolefin solutions are conducted to separate manifolds in a multi-layer extrusion die and laminated at a die lip inlet. In another such embodiment, block extrusion can be used, in which the first and second polyolefin solutions are first combined into a laminar flow (i.e., in advance), with the laminar flow then connected to a die. Because multi-manifold and block processes are known to those skilled in the art of processing polyolefin films (e.g., as disclosed in JP06-122142 A, JP06-106599A), they are deemed conventional, therefore, their operation will be not described in detail.

Die selection is not critical, and, e.g., a conventional multi-layer-sheet-forming, flat or inflation die can be used. Die gap is not critical. For example, the multi-layer-sheet-forming flat die can have a die gap of about 0.1 mm to about 5 mm. Die temperature and extruding speed are also non-critical parameters. For example, the die can be heated to a die temperature ranging from about 140° C. to about 250° C. during extrusion. The extruding speed can range, for example, from about 0.2 m/minute to about 15 m/minute. The thickness of the layers of the layered extrudate can be independently selected. For example, the gel-like sheet can have relatively thick surface layers (or "skin" layers) compared to the thickness of an intermediate layer of the layered extrudate.

While the extrusion has been described in terms of embodiments producing two and three-layer extrudates, the extrusion step is not limited thereto. For example, a plurality of dies and/or die assemblies can be used to produce multi-layer extrudates having four or more layers using the extrusion methods of the preceding embodiments. In such a layered extrudate, each surface or intermediate layer can be produced using either the first polyolefin solution and/or the second polyolefin solution.

(4) Formation of a Multi-Layer, Gel-Like Sheet

The multi-layer extrudate can be formed into a multi-layer, gel-like sheet by cooling, for example. Cooling rate and cooling temperature are not particularly critical. For example, the multi-layer, gel-like sheet can be cooled at a cooling rate of at least about 50° C./minute until the temperature of the multi-layer, gel-like sheet (the cooling temperature) is approximately equal to the multi-layer, gel-like sheet's gelation temperature (or lower). In an embodiment, the extrudate is cooled to a temperature of about 25° C. or lower in order to form the multi-layer, gel-like sheet. While not wishing to be bound by any theory or model, it is believed that cooling the layered extrudate sets the polyolefin micro-phases of the first and second polyolefin solutions for separation by the membrane-forming solvent or solvents. It has been observed that in general a slower cooling rate (e.g., less than 50° C./minute) provides the multi-layer, gel-like sheet with larger pseudo-cell units, resulting in a coarser higher-order structure. On the other hand, a relatively faster cooling rate (e.g., 80° C./minute) results in denser cell units. Although it is not a critical parameter, when the cooling rate of the extrudate is less than 50° C./minute, increased polyolefin crystallinity in the layer can result, which can make it more difficult to process the multi-layer, gel-like sheet in subsequent stretching steps. The choice of cooling method is not critical. For example conventional sheet cooling methods can be used. In an embodiment, the cooling method comprises contacting the layered extrudate with a cooling medium such as cooling air, cooling water, etc. Alternatively, the extrudate can be cooled via contact with rollers cooled by a cooling medium, etc.

(5) Removal of the First and Second Membrane-Forming Solvents

In an embodiment, at least a portion of the first and second membrane-forming solvents are removed (or displaced) from the multi-layer, gel-like sheet in order to form a solvent-removed gel-like sheet. A displacing (or "washing") solvent can be used to remove (wash away, or displace) the first and second membrane-forming solvents. While not wishing to be bound by any theory or model, it is believed that because the polyolefin phases in the multi-layer, gel-like sheet produced from the first polyolefin solution and the second polyolefin solution (i.e., the first polyolefin and the second polyolefin) are separated from the membrane-forming solvent phase, the removal of the membrane-forming solvent provides a porous membrane constituted by fibrils forming a fine three-dimensional network structure and having pores communicating three-dimensionally and irregularly. The choice of washing solvent is not critical provided it is capable of dissolving or displacing at least a portion of the first and/or second membrane-forming solvent. Suitable washing solvents include, for instance, one or more of volatile solvents such as saturated hydrocarbons such as pentane, hexane, heptane, etc.; chlorinated hydrocarbons such as methylene chloride, carbon tetrachloride, etc.; ethers such as diethyl ether, dioxane, etc.; ketones such as methyl ethyl ketone, etc.; linear fluorocarbons such as trifluoroethane, $C_6F_{14}$, $C_7F_{16}$, etc.; cyclic hydrofluorocarbons such as $C_5H_3F_7$, etc.; hydrofluoroethers such as $C_4F_9OCH_3$, $C_4F_9OC_2H_5$, etc.; and perfluoroethers such as $C_4F_9OCF_3$, $C_4F_9OC_2F_5$, etc.

The method for removing the membrane-forming solvent is not critical, and any method capable of removing a significant amount of solvent can be used, including conventional solvent-removal methods. For example, the multi-layer, gel-like sheet can be washed by immersing the sheet in the washing solvent and/or showering the sheet with the washing solvent. The amount of washing solvent used is not critical, and will generally depend on the method selected for removal of the membrane-forming solvent. For example, the amount of washing solvent used can range from about 300 to about 30,000 parts by mass, based on the mass of the gel-like sheet. While the amount of membrane-forming solvent removed is not particularly critical, generally a higher quality (more porous) membrane will result when at least a major amount of first and second membrane-forming solvent is removed from the gel-like sheet. In an embodiment, the membrane-forming solvent is removed from the gel-like sheet (e.g., by washing) until the amount of the remaining membrane-forming solvent in the multi-layer, gel-like sheet becomes less than 1 wt. %, based on the weight of the gel-like sheet.

(6) Drying of the Solvent-Removed Gel-Like Sheet

In an embodiment, the solvent-removed multi-layer, gel-like sheet obtained by removing at least a portion of the membrane-forming solvent is dried in order to remove the washing solvent. Any method capable of removing the washing solvent can be used, including conventional methods such as heat-drying, wind-drying (moving air), etc. The temperature of the gel-like sheet during drying (i.e., drying temperature) is not critical. For example, the drying temperature can be equal to or lower than the crystal dispersion temperature Tcd. Tcd is the lower of the crystal dispersion temperature $Tcd_1$ of the first polyethylene resin and the crystal dispersion temperature $Tcd_2$ of the second polyethylene resin (when used). For example, the drying temperature can be at least 5° C. below the crystal dispersion temperature Tcd. The crystal dispersion temperature of the first and second polyethylene resin can be determined by measuring the temperature characteristics of the kinetic viscoelasticity of the polyethylene resin according to ASTM D 4065. In an embodiment, at least one of the first or second polyethylene resins have a crystal dispersion temperature in the range of about 90° C. to about 100° C.

Although it is not critical, drying can be conducted until the amount of remaining washing solvent is about 5 wt. % or less on a dry basis, i.e., based on the weight of the dry multi-layer, microporous polyolefin membrane. In another embodiment, drying is conducted until the amount of remaining washing solvent is about 3 wt. % or less on a dry basis. Insufficient drying can be recognized because it generally leads to an undesirable decrease in the porosity of the multi-layer, microporous membrane. If this is observed, an increased drying temperature and/or drying time should be used. Removal of the washing solvent, e.g., by drying or otherwise, results in the formation of the multi-layer, microporous polyolefin membrane.

(7) Stretching

Prior to the step for removing the membrane-forming solvents (namely prior to step 5), the multi-layer, gel-like sheet can be stretched in order to obtain a stretched, multi-layer, gel-like sheet. It is believed that the presence of the first and second membrane-forming solvents in the multi-layer, gel-like sheet results in a relatively uniform stretching magnification. Heating the multi-layer, gel-like sheet, especially at the start of stretching or in a relatively early stage of stretching (e.g., before 50% of the stretching has been completed) is also believed to aid the uniformity of stretching.

Neither the choice of stretching method nor the degree of stretching magnification are particularly critical. For example, any method capable of stretching the multi-layer, gel-like sheet to a predetermined magnification (including any optional heating) can be used. In an embodiment, the stretching can be accomplished by one or more of tenter-stretching, roller-stretching, or inflation stretching (e.g., with air). Although the choice is not critical, the stretching can be conducted monoaxially (i.e., in either the machine or transverse direction) or biaxially (both the machine or transverse direction). In an embodiment, biaxial stretching is used. In the case of biaxial stretching (also called biaxial orientation), the stretching can be simultaneous biaxial stretching, sequential stretching along one planar axis and then the other (e.g., first in the transverse direction and then in the machine direction), or multi-stage stretching (for instance, a combination of the simultaneous biaxial stretching and the sequential stretching). In an embodiment, simultaneous biaxial stretching is used.

The stretching magnification is not critical. In an embodiment where monoaxial stretching is used, the linear stretching magnification can be, e.g., about 2 fold or more, or about 3 to about 30 fold. In an embodiment where biaxial stretching is used, the linear stretching magnification can be, e.g., about 3 fold or more in any lateral direction. In another embodiment, the area magnification resulting from stretching is at least about 9 fold, or at least about 16 fold, or at least about 25 fold.

Although it is not a critical parameter, when the stretching results in an area magnification of at least about 9 fold, the multi-layer, microporous polyolefin membrane has a relatively higher pin puncture strength. When attempting an area magnification of more than about 400 fold, it can be more difficult to operate the stretching apparatus.

The temperature of the multi-layer, gel-like sheet during stretching (namely the stretching temperature) is not critical. In an embodiment, the temperature of the gel-like sheet during stretching can be about (Tm+10° C.) or lower, or optionally in a range that is higher than Tcd but lower than Tm, wherein Tm is the lesser of the melting point $Tm_1$ of the first polyethylene and the melting point $Tm_2$ of the second polyethylene (when used). Although this parameter is not critical, when the stretching temperature is higher than approximately the melting point Tm+10° C., at least one of the first or second polyethylene can be in the molten state, which can make it more difficult to orient the molecular chains of the polyolefin in the multi-layer, gel-like sheet during stretching. And when the stretching temperature is lower than approximately Tcd, at least one of the first or second polyethylene can be so insufficiently softened that it is difficult to stretch the multi-layer, gel-like sheet without breakage or tears, which can result in a failure to achieve the desired stretching magnification. In an embodiment, the stretching temperature ranges from about 90° C. to about 140° C., or from about 100° C. to about 130° C.

While not wishing to be bound by any theory or model, it is believed that such stretching causes cleavage between polyethylene lamellas, making the polyethylene phases finer and forming large numbers of fibrils. The fibrils form a three-dimensional network structure (three-dimensionally irregularly connected network structure). Consequently, the stretching when used generally makes it easier to produce a relatively high-mechanical strength multi-layer, microporous polyolefin membrane with a relatively large pore size. Such multi-layer, microporous membranes are believed to be particularly suitable for use as battery separators.

Optionally, stretching can be conducted in the presence of a temperature gradient in a thickness direction (i.e., a direction approximately perpendicular to the planar surface of the multi-layer, microporous polyolefin membrane). In this case, it can be easier to produce a multi-layer, microporous polyolefin membrane with improved mechanical strength. The details of this method are described in Japanese Patent 3347854.

(8) Hot Solvent Treatment Step

Although it is not required, the multi-layer, gel-like sheet can be treated with a hot solvent between steps (4) and (5). When used, it is believed that the hot solvent treatment provides the fibrils (such as those formed by stretching the multi-layer, gel-like sheet) with a relatively thick leaf-vein-like structure. Such a structure, it is believed, makes it less difficult to produce a multi-layer, microporous membrane having large pores with relatively high strength and permeability. The term "leaf-vein-like" means that the fibrils have thick trunks and thin fibers extending therefrom in a network structure. The details of this method are described in WO 2000/20493.

(9) Stretching of Multi-Layer, Microporous Membrane ("Dry Stretching")

In an embodiment, the dried multi-layer, microporous membrane of step (6) can be stretched, at least monoaxially. The stretching method selected is not critical, and conventional stretching methods can be used such as by a tenter method, etc. While it is not critical, the membrane can be heated during stretching. While the choice is not critical, the stretching can be monoaxial or biaxial. When biaxial stretching is used, the stretching can be conducted simultaneously in both axial directions, or, alternatively, the multi-layer, microporous polyolefin membrane can be stretched sequentially, e.g., first in the machine direction and then in the transverse direction. In an embodiment, simultaneous biaxial stretching is used. When the multi-layer, gel-like sheet has been stretched as described in step (7) the stretching of the dry multi-layer, microporous polyolefin membrane in step (9) can be called dry-stretching, re-stretching, or dry-orientation.

The temperature of the dry multi-layer, microporous membrane during stretching (the "dry stretching temperature") is not critical. In an embodiment, the dry stretching temperature is approximately equal to the melting point Tm or lower, for example in the range of from about the crystal dispersion temperature Tcd to the about the melting point Tm. When the dry stretching temperature is higher than Tm, it can be more difficult to produce a multi-layer, microporous polyolefin membrane having a relatively high compression resistance with relatively uniform air permeability characteristics, particularly in the transverse direction when the dry multi-layer, microporous polyolefin membrane is stretched transversely. When the stretching temperature is lower than Tcd, it can be more difficult to sufficiently soften the first and second polyolefins, which can lead to tearing during stretching, and a lack of uniform stretching. In an embodiment, the dry stretching temperature ranges from about 90° C. to about 135° C., or from about 95° C. to about 130° C.

When dry-stretching is used, the stretching magnification is not critical. For example, the stretching magnification of the multi-layer, microporous membrane can range from about 1.1 fold to about 1.8 fold in at least one lateral (planar) direction. Thus, in the case of monoaxial stretching, the stretching magnification can range from about 1.1 fold to about 1.8 fold in the longitudinal direction (i.e., the "machine direction") or the transverse direction, depending on whether the membrane is stretched longitudinally or transversely. Monoaxial stretching can also be accomplished along a planar axis between the longitudinal and transverse directions.

In an embodiment, biaxial stretching is used (i.e., stretching along two planar axis) with a stretching magnification of about 1.1 fold to about 1.8 fold along both stretching axes, e.g., along both the longitudinal and transverse directions. The stretching magnification in the longitudinal direction need not be the same as the stretching magnification in the transverse direction. In other words, in biaxial stretching, the stretching magnifications can be selected independently. In an embodiment, the dry-stretching magnification is the same in both stretching directions. Incidentally, because the re-stretching is usually conducted on the multi-layer, microporous membrane in a long sheet form, which is obtained from the stretched multi-layer, gel-like sheet, the directions of MD and TD in the re-stretching is the same as those in the stretching of the multi-layer, gel-like sheet. This is true in other production methods.

(10) Heat Treatment

In an embodiment, the dried multi-layer, microporous membrane can be heat-treated following step (6). It is believed that heat-treating stabilizes the polyolefin crystals in the dried multi-layer, microporous polyolefin membrane to form uniform lamellas. In an embodiment, the heat treatment comprises heat-setting and/or annealing. When heat-setting is used, it can be conducted using conventional methods such as tenter methods and/or roller methods. Although it is not critical, the temperature of the dried multi-layer, microporous polyolefin membrane during heat-setting (i.e., the "heat-setting temperature") can range from the Tcd to about the Tm. In an embodiment, the heat-setting temperature ranges from about the dry stretching temperature of the multi-layer, microporous polyolefin membrane ±5° C., or about the dry stretching temperature of the multi-layer, microporous polyolefin membrane ±3° C.

Annealing differs from heat-setting in that it is a heat treatment with no load applied to the multi-layer, microporous polyolefin membrane. The choice of annealing method is not critical, and it can be conducted, for example, by using a heating chamber with a belt conveyer or an air-floating-type heating chamber. Alternatively, the annealing can be conducted after the heat-setting with the tenter clips slackened. The temperature of the multi-layer, microporous polyolefin membrane during annealing (i.e., the annealing temperature) is not critical. In an embodiment, the annealing temperature ranges from about the melting point Tm or lower, or in a range from about 60° C. to (Tm−10° C.). It is believed that annealing makes it less difficult to produce a multi-layer, microporous polyolefin membrane having relatively high permeability and strength.

(11) Cross-Linking

In an embodiment, the multi-layer, microporous polyolefin membrane can be cross-linked (e.g., by ionizing radiation rays such as α-rays, β-rays, γ-rays, electron beams, etc.) after step (6). For example, when irradiating electron beams are used for cross-linking, the amount of electron beam radiation can be about 0.1 Mrad to about 100 Mrad, using an accelerating voltage in the range of about 100 kV to about 300 kV. It is believed that the cross-linking treatment makes it less difficult to produce a multi-layer, microporous polyolefin membrane with relatively high meltdown temperature.

(12) Hydrophilizing Treatment

In an embodiment, the multi-layer, microporous polyolefin membrane can be subjected to a hydrophilic treatment (i.e., a treatment which makes the multi-layer, microporous polyolefin membrane more hydrophilic). The hydrophilic treatment can be, for example, a monomer-grafting treatment, a surfactant treatment, a corona-discharging treatment, etc. In an embodiment, the monomer-grafting treatment is used after the cross-linking treatment.

When a surfactant treatment is used, any of nonionic surfactants, cationic surfactants, anionic surfactants and amphoteric surfactants can be used, for example, either alone or in combination. In an embodiment, a nonionic surfactant is used. The choice of surfactant is not critical. For example, the multi-layer, microporous polyolefin membrane can be dipped in a solution of the surfactant and water or a lower alcohol such as methanol, ethanol, isopropyl alcohol, etc., or coated with the solution, e.g., by a doctor blade method.

B. Second Production Method

The second method for producing the multi-layer, microporous polyolefin membrane comprises the steps of (1) combining (e.g., by melt-blending) a first polyolefin composition and a first membrane-forming solvent to prepare a first polyolefin solution, (2) combining a second polyolefin composition and a second membrane-forming solvent to prepare a second polyolefin solution, (3) extruding the first polyolefin solution through a first die and the second solution through a second die and then laminating the extruded first and second polyolefin solutions to form a multi-layer extrudate, (4) cooling the multi-layer extrudate to form a multi-layer, gel-like sheet, (5) removing at least a portion of the membrane-forming solvent from the multi-layer, gel-like sheet to form a solvent-removed gel-like sheet, and (6) drying the solvent-removed gel-like sheet in order to form the multi-layer, microporous membrane. An optional stretching step (7), and an optional hot solvent treatment step (8), etc., can be conducted between steps (4) and (5), if desired. After step (6), an optional step (9) of stretching a multi-layer, microporous membrane, an optional heat treatment step (10), an optional cross-linking step with ionizing radiations (11), and an optional hydrophilic treatment step (12), etc., can be conducted.

The process steps and conditions of the second production method are generally the same as those of the analogous steps described in connection with the first production method, except for step (3). Consequently, step (3) will be explained in more detail.

The type of die used is not critical provided the die is capable of forming an extrudate that can be laminated. In one embodiment, sheet dies (which can be adjacent or connected) are used to form the extrudates. The first and second sheet dies are connected to first and second extruders, respectively, where the first extruder contains the first polyolefin solution and the second extruder contains the second polyolefin solution. While not critical, lamination is generally easier to accomplish when the extruded first and second polyolefin solution are still at approximately the extrusion temperature. The other conditions may be the same as in the first method.

In another embodiment, the first, second, and third sheet dies are connected to first, second and third extruders, where the first and third sheet dies contain the first polyolefin solutions, and the second sheet die contains the second polyolefin solution. In this embodiment, a laminated extrudate is formed constituting outer layers comprising the extruded first polyolefin solution and one intermediate comprising the extruded second polyolefin solution.

In yet another embodiment, the first, second, and third sheet dies are connected to first, second, and third extruders, where the second sheet die contains the first polyolefin solution, and the first and third sheet dies contain the second polyolefin solution. In this embodiment, a laminated extrudate is formed constituting outer layers comprising the extruded second polyolefin solution and one intermediate comprising extruded first polyolefin solution.

C. Third Production Method

The third method for producing the multi-layer, microporous polyolefin membrane comprises the steps of (1) combining (e.g., by melt-blending) a first polyolefin composition and a membrane-forming solvent to prepare a first polyolefin solution, (2) combining a second polyolefin composition and a second membrane-forming solvent to prepare a second polyolefin solution, (3) extruding the first polyolefin solution through at least one first die to form at least one first extrudate, (4) extruding the second polyolefin solution through at least one second die to form at least one second extrudate, (5) cooling first and second extrudates to form at least one first gel-like sheet and at least one second gel-like sheet, (6) laminating the first and second gel-like sheet to form a multi-layer, gel-like sheet, (7) removing at least a portion of the membrane-forming solvent from the resultant multi-layer, gel-like sheet to form a solvent-removed gel-like sheet, and (8) drying the solvent-removed gel-like sheet in order to form the multi-layer, microporous membrane. An optional stretching step (9), and an optional hot solvent treatment step (10), etc., can be conducted between steps (5) and (6) or between steps (6) and (7), if desired. After step (8), an optional step (11) of stretching a multi-layer, microporous membrane, an optional heat treatment step (12), an optional cross-linking step with ionizing radiations (13), and an optional hydrophilic treatment step (14), etc., can be conducted.

The main difference between the third production method and the second production method is in the order of the steps for laminating and cooling.

In the second production method, laminating the first and second polyolefin solutions is conducted before the cooling step. In the third production method, the first and second polyolefin solutions are cooled before the laminating step.

The steps of (1), (2), (7) and (8) in the third production method can be the same as the steps of (1), (2), (5) and (6) in the first production method as described above. For the extrusion of the first polyolefin solution through the first die, the conditions of step (3) of the second production method can be used for step (3) of the third production method. For the extrusion of the second solution through the second die, the conditions of step (4) in the third production method can be the same as the conditions of step (3) in the second production method. In one embodiment, either the first or second polyolefin solution is extruded through a third die. In this way, a multi-layer laminate can be formed having two layers produced from the first polyolefin solution and a single layer produced from the second polyolefin solution, or vice versa.

Step (5) of the third production method can be the same as step (4) in the first production method except that in the third production method the first and second gel-like sheets are formed separately.

The step (6) of laminating the first and second gel-like sheets will now be explained in more detail. The choice of lamination method is not particularly critical, and conventional lamination methods such as heat-induced lamination can be used to laminate the multi-layer, gel-like sheet. Other suitable lamination methods include, for example, heat-sealing, impulse-sealing, ultrasonic-bonding, etc., either alone or in combination. Heat-sealing can be conducted using, e.g., one or more pair of heated rollers where the gel-like sheets are conducted through at least one pair of the heated rollers. Although the heat-sealing temperature and pressure are not particularly critical, sufficient heating and pressure should be applied for a sufficient time to ensure that the gel-like sheets are appropriately bonded to provide a multi-layer, microporous membrane with relatively uniform properties and little tendency toward delamination. In an embodiment, the heat-sealing temperature can be, for instance, about 90° C. to about 135° C., or from about 90° C. to about 115° C. In an embodiment, the heat-sealing pressure can be from about 0.01 MPa to about −50 MPa.

As is the case in the first and second production method, the thickness of the layers formed from the first and second polyolefin solution (i.e., the layers comprising the first and second microporous layer materials) can be controlled by adjusting the thickness of the first and second gel-like sheets and by the amount of stretching (stretching magnification and dry stretching magnification), when one or more stretching steps are used. Optionally, the lamination step can be combined with a stretching step by passing the gel-like sheets through multi-stages of heated rollers.

In an embodiment, the third production method forms a multi-layer, polyolefin gel-like sheet having at least three layers. For example, after cooling two extruded first polyolefin solutions and one extruded second polyolefin solution to form the gel-like sheets, the multi-layer, gel-like sheet can be laminated with outer layers comprising the extruded first polyolefin solution and an intermediate layer comprising the extruded second polyolefin solution. In another embodiment, after cooling two extruded second polyolefin solutions and one extruded first polyolefin solution to form the gel-like sheets, the multi-layer, gel-like sheet can be laminated with outer layers comprising the extruded second polyolefin solution and an intermediate layer comprising the extruded first polyolefin solution.

The stretching step (9) and the hot solvent treatment step (10) can be the same as the stretching step (7) and the hot solvent treatment step (8) as described for the first production method, except stretching step (9) and hot solvent treatment step (10) are conducted on the first and/or second gel-like sheets. The stretching temperatures of the first and second gel-like sheets are not critical. For example, the stretching temperatures of the first gel-like sheet can be, e.g., $Tm_1+10°$ C. or lower, or optionally about $Tcd_1$ or higher but lower than about $Tm_1$. The stretching temperature of the second gel-like sheet can be, e.g., $Tm_2+10°$ C. or lower, or optionally about $Tcd_2$ or higher but lower than about $Tm_2$.

D. Fourth Production Method

The fourth method for producing the multi-layer, microporous polyolefin membrane comprises the steps of (1) combining (e.g., by melt-blending) a first polyolefin composition and a membrane-forming solvent to prepare a first polyolefin solution, (2) combining a second polyolefin composition and a second membrane-forming solvent to prepare a second polyolefin solution, (3) extruding the first polyolefin solution through at least one first die to form at least one first extrudate, (4) extruding the second polyolefin solution through at least one second die to form at least one second extrudate, (5) cooling first and second extrudates to form at least one first gel-like sheet and at least one second gel-like sheet, (6) removing at least a portion of the first and second membrane-forming solvents from the first and second gel-like sheets to form solvent-removed first and second gel-like sheets, (7) drying the solvent-removed first and second gel-like sheets to form at least one first polyolefin membrane and at least one second polyolefin membrane, and (8) laminating the first and second microporous polyolefin membranes in order to form the multi-layer, microporous polyolefin membrane.

A stretching step (9), a hot solvent treatment step (10), etc., can be conducted between steps (5) and (6), if desired. A stretching step (11), a heat treatment step (12), etc., can be conducted between steps (7) and (8), if desired. After step (8), a step (13) of stretching a multi-layer, microporous membrane, a heat treatment step (14), a cross-linking step with ionizing radiations (15), a hydrophilic treatment step (16), etc., can be conducted if desired.

Steps (1) and (2) in the fourth production method can be conducted under the same conditions as steps of (1) and (2) in the first production method. Steps (3), (4), and (5) in the fourth production method can be conducted under the same conditions as steps (3), (4), and (5) in the third method. Step (6) in the fourth production method can be conducted under the same conditions as step (5) in the first production method except for removing the membrane-forming solvent from the first and second gel-like sheets. Step (7) in the fourth production method can be conducted under the same conditions as step (6) in the first production method except that in the fourth production method the first and second solvent-removed gel-like sheets are dried separately. Step (8) in the fourth production method can be conducted under the same conditions as the step (6) in the third production method except for laminating the first and second microporous polyolefin membranes. The stretching step (9) and the hot solvent treatment step (10) in the fourth production method can be conducted under the same conditions as step (9) and (10) in the third production method. The stretching step (11) and the heat treatment step (12) in the fourth production method can be conducted under the same conditions as steps (9) and (10) in the first production method except that in the fourth production method the first and second microporous polyolefin membranes are stretched and/or heat treated.

In an embodiment, in the stretching step (11) in the fourth production method, the stretching temperature of the first microporous polyolefin membranes can be about $Tm_1$ or lower, or optionally about $Tcd_1$ to about $Tm_1$, and the stretching temperature of the second microporous polyolefin membrane can be about $Tm_2$ or lower, or optionally about $Tcd_2$ to about $Tm_2$.

In an embodiment, the heat treatment step (12) in the fourth production method can be heat-setting and/or annealing. For example, in the heat treatment step (12) in the fourth production method, the heat-setting temperature of the first microporous polyolefin membranes can be about $Tcd_1$ to about $Tm_1$, or optionally about the dry stretching temperature ±5° C., or optionally about the dry stretching temperature ±3° C. In an embodiment, in the heat treatment step (12) in the fourth production method, the heat-setting temperature of the second microporous membrane can be about $Tcd_2$ to about $Tm_2$, or optionally the dry stretching temperature ±5° C., or optionally the dry stretching temperature ±3° C. When the heat-setting is used, it can be conducted by, e.g., a tenter method or a roller method.

In an embodiment, in the heat treatment step (12) in the fourth production method, the annealing temperature of the first microporous membrane can be about $Tm_1$ or lower, or optionally about 60° C. to about ($Tm_1$−10° C.). In an embodiment, in the heat treatment step (12) in the fourth production method, the annealing temperature of the second microporous membrane can be about $Tm_2$ or lower, or optionally about 60° C. to about ($Tm_2$−10° C.).

The conditions in step (13), stretching a multi-layer, microporous membrane, a heat treatment step (14), a cross-linking step with ionizing radiations (15), and a hydrophilic treatment step (16) in the fourth production method can be the same as those for steps (9), (10), (11) and (12) in the first production method.

[4] The Properties of a Multi-Layer, Microporous Polyolefin Membrane

In an embodiment, the multi-layer, microporous polyolefin membrane has a thickness ranging from about 3 μm to about 200 μm, or about 5 μm to about 50 μm. Optionally, the multi-layer, microporous polyolefin membrane has one or more of the following characteristics.

A. Porosity of About 25% to About 80%

When the porosity is less than 25%, the multi-layer, microporous polyolefin membrane generally does not exhibit the desired air permeability for use as a battery separator. When the porosity exceeds 80%, it is more difficult to produce a battery separator of the desired strength, which can increase the likelihood of internal electrode short-circuiting.

B. Air Permeability of About 20 Seconds/100 cm³ to About 400 Seconds/100 cm³ (Converted to Value at 20-μm Thickness)

When the air permeability of the multi-layer, microporous polyolefin membrane (as measured according to JIS P8117) ranges from about 20 seconds/100 cm³ to about 400 seconds/100 cm³, it is less difficult to form batteries having the desired charge storage capacity and desired cyclability. When the air permeability is less than about 20 seconds/100 cm³, it is more difficult to produce a battery having the desired shutdown characteristics, particularly when the temperatures inside the batteries are elevated. Air permeability $P_1$ measured on a multi-layer, microporous membrane having a thickness $T_1$ according to JIS P8117 can be converted to air permeability $P_2$ at a thickness of 20 μm by the equation of $P_2=(P_1 \times 20)/T_1$.

C. Pin Puncture Strength of About 2,000 mN/20 μm or More

The pin puncture strength (converted to the value at a 20-μm membrane thickness) is the maximum load measured when the multi-layer, microporous polyolefin membrane is pricked with a needle 1 mm in diameter with a spherical end surface (radius R of curvature: 0.5 mm) at a speed of 2 mm/second. When the pin puncture strength of the multi-layer, microporous polyolefin membrane is less than 2,000 mN/20 μm, it is more difficult to produce a battery having the desired mechanical integrity, durability, and toughness.

D. Tensile Strength of at Least About 49,000 kPa

When the tensile strength according to ASTM D882 of the multi-layer, microporous polyolefin membrane is at least about 49,000 kPa in both longitudinal and transverse directions, it is less difficult to produce a battery of the desired mechanical strength. The tensile strength of the multi-layer, microporous polyolefin membrane is preferably 80,000 kPa or more.

E. Tensile Elongation of at Least About 100%

When the tensile elongation according to ASTM D882 of the multi-layer, microporous polyolefin membrane is 100% or more in both longitudinal and transverse directions, it is less difficult to produce a battery having the desired mechanical integrity, durability, and toughness.

F. Heat Shrinkage Ratio of at Least About 12%

When the heat shrinkage ratio measured after holding the multi-layer, microporous polyolefin membrane at a membrane temperature of about 105° C. for 8 hours exceeds 12% in both longitudinal and transverse directions, it is more difficult to produce a battery that will not exhibit internal short-circuiting when the heat generated in the battery results in the shrinkage of the separators.

G. Thickness Variation Ratio of About 15% or Less

When the thickness variation ratio of the multi-layer, microporous polyolefin membrane exceeds about 15%, it is more difficult to produce a battery having the desired protection against internal short-circuiting. The thickness variation ratio of the multi-layer, microporous polyolefin membrane can be measured by a contact thickness meter at a 5 mm interval over the length of 30 cm in a transverse direction, and determined by the following equation:

Thickness variation ratio (%)=[(maximum thickness)−(minimum thickness)/(average thickness)]×100.

H. Shutdown Temperature of About 140° C. or Lower

When the shutdown temperature of the multi-layer, microporous polyolefin membrane exceeds 140° C., it is more difficult to produce a battery separator with the desired shutdown response when the battery is overheated. One way to determine shutdown temperature involves determining the temperature at a point of inflection observed near the melting point of the multi-layer, microporous polyolefin membrane, under the condition that a test piece of 3 mm in the longitudinal direction and 10 mm in the transverse direction is heated from room temperature at a speed of 5° C./minute while drawing the test piece in the longitudinal direction under a load of 2 g.

I. Meltdown Temperature of at Least About 150° C.

In an embodiment, the meltdown temperature can range from about 150° C. to about 190° C. One way to measure meltdown temperature involves determining the temperature at which a multi-layer, microporous polyolefin membrane test piece of 3 mm in the longitudinal direction and 10 mm in the transverse direction is broken by melting, under the conditions that the test piece is heated from room temperature at a heating rate of 5° C./minute while drawing the test piece in the longitudinal direction under a load of 2 g.

J. Shutdown Rate of About 10 Seconds or Less

When the shutdown rate of the multi-layer, microporous polyolefin membrane at 135° C. exceeds 10 seconds, it is more difficult to produce a battery having the desired shutdown response when overheated. One way to measure shutdown rate involves fixing a plurality of multi-layer, microporous polyolefin membrane to a plate that is temperature-controlled to a value of 135° C. Starting at the time when the multi-layer, microporous polyolefin membrane is placed in planar contact with the heated plate, the time duration is recorded while air permeability is measured. The time duration (in seconds) for the air permeability to reach 100,000 sec/100 cm$^3$ (converted to the value at 20 µm) is defined as "shutdown rate".

K. Battery Capacity Recovery Ratio of 70% or More (Retention Property of Lithium Secondary Battery)

When the lithium ion secondary battery comprising a separator formed by a multi-layer, microporous membrane is stored at a temperature of 80° C. for 30 days, it is desired that the battery capacity recovery ratio [(capacity after high-temperature storing)/(initial capacity)]×100 (%) should be 70% or more. The battery capacity recovery ratio is preferably 75% or more.

[5] Battery Separator

In and embodiment, the battery separator formed by the above multi-layer, microporous polyolefin membrane has a thickness in the range of about 3 µm to about 200 µm, or about 5 µm to about 50 µm. Depending, e.g., on the choice of electrolyte, separator swelling might increase the final thickness to a value larger than 200 µm.

[6] Battery

In an embodiment, the multi-layer, microporous polyolefin membrane can be used as a separator for primary and secondary batteries such as lithium ion batteries, lithium-polymer secondary batteries, nickel-hydrogen secondary batteries, nickel-cadmium secondary batteries, nickel-zinc secondary batteries, silver-zinc secondary batteries, and particularly for lithium ion secondary batteries. Explanations will be made below on the lithium ion secondary batteries.

The lithium secondary battery comprises a cathode, an anode, and a separator located between the anode and the cathode. The separator generally contains an electrolytic solution (electrolyte). The electrode structure is not critical, and conventional electrode structures can be used. The electrode structure may be, for instance, a coin type in which a disc-shaped cathode and anode are opposing, a laminate type in which a planar cathode and anode are alternately laminated with at least one separator situated between the anode and the cathode, a toroidal type in which ribbon-shaped cathode and anode are wound, etc.

The cathode generally comprises a current collector, and a cathodic-active material layer capable of absorbing and discharging lithium ions, which is formed on the current collector. The cathodic-active materials can be, e.g., inorganic compounds such as transition metal oxides, composite oxides of lithium and transition metals (lithium composite oxides), transition metal sulfides, etc. The transition metals can be, e.g., V, Mn, Fe, Co, Ni, etc. In an embodiment, the lithium composite oxides are lithium nickelate, lithium cobaltate, lithium manganate, laminar lithium composite oxides based on α-NaFeO$_2$, etc. The anode generally comprises a current collector, and a negative-electrode active material layer formed on the current collector. The negative-electrode active materials can be, e.g., carbonaceous materials such as natural graphite, artificial graphite, cokes, carbon black, etc.

The electrolytic solutions can be obtained by dissolving lithium salts in organic solvents. The choice of solvent and/or lithium salt is not critical, and conventional solvents and salts can be used. The lithium salts can be, e.g., LiClO$_4$, LiPF$_6$, LiAsF$_6$, LiSbF$_6$, LiBF$_4$, LiCF$_3$SO$_3$, LiN(CF$_3$SO$_2$)$_2$, LiC(CF$_3$SO$_2$)$_3$, Li$_2$B$_{10}$Cl$_{10}$, LiN(C$_2$F$_5$SO$_2$)$_2$, LiPF$_4$(CF$_3$)$_2$, LiPF$_3$(C$_2$F$_5$)$_3$, lower aliphatic carboxylates of lithium, LiAlCl$_4$, etc. The lithium salts may be used alone or in combination. The organic solvents can be organic solvents having relatively high boiling points (compared to the battery's shutdown temperature) and high dielectric constants. Suitable organic solvents include ethylene carbonate, propylene carbonate, ethylmethyl carbonate, γ-butyrolactone, etc.; organic solvents having low boiling points and low viscosity such as tetrahydrofuran, 2-methyltetrahydrofuran, dimethoxyethane, dioxolane, dimethyl carbonate, diethyl carbonate, and the like, including mixtures thereof. Because the organic solvents generally having high dielectric constants generally also have a high viscosity, and vice versa, mixtures of high- and low-viscosity solvents can be used.

When the battery is assembled, the separator is generally impregnated with the electrolytic solution, so that the separator (multi-layer, microporous membrane) is provided with ion permeability. The choice of impregnation method is not critical, and conventional impregnation methods can be used. For example, the impregnation treatment can be conducted by immersing the multi-layer, microporous membrane in an electrolytic solution at room temperature.

The method selected for assembling the battery is not critical, and conventional battery-assembly methods can be used. For example, when a cylindrical battery is assembled, a cathode sheet, a separator formed by the multi-layer, microporous membrane and an anode sheet are laminated in this order, and the resultant laminate is wound to a toroidal-type electrode assembly. A second separator might be needed to prevent short-circuiting of the toroidal windings. The resultant electrode assembly can be deposited into a battery can and then impregnated with the above electrolytic solution, and a battery lid acting as a cathode terminal provided with a safety valve can be caulked to the battery can via a gasket to produce a battery.

[7] Examples

The present invention will be explained in more detail referring to the following examples.

Example 1

(1) Preparation of First Polyolefin Solution

Dry-blended were 99.8 parts by weight of a polyolefin (PO) resin comprising 5 wt. % of ultra-high-molecular-weight polyethylene (UHMWPE) having a weight-average molecular weight (Mw) of 2.0×10$^6$, 90 wt. % of high-density polyethylene (HDPE) having Mw of 3.5×10$^5$, and 5 wt. % of a polypropylene homopolymer (PP) having Mw of 5.3×10$^5$; and 0.2 parts by weight of tetrakis[methylene-3-(3,5-ditertiary-butyl-4-hydroxyphenyl)-propionate]methane as an antioxidant. The polyethylene in the blend (comprising UHMWPE and HDPE) had a melting point of 135° C., and a crystal dispersion temperature of 100° C.

The Mws of UHMWPE, HDPE and PP were measured by a gel permeation chromatography (GPC) method under the following conditions.

Measurement apparatus: GPC-150C available from Waters Corporation,
Column: Shodex UT806M available from Showa Denko K.K.,
Column temperature: 135° C.,
Solvent (mobile phase): o-dichlorobenzene,
Solvent flow rate: 1.0 ml/minute,
Sample concentration: 0.1% by mass (dissolved at 135° C. for 1 hour),
Injected amount: 500 µl,
Detector: Differential Refractometer available from Waters Corp., and
Calibration curve: Produced from a calibration curve of a single-dispersion, standard polystyrene sample using a predetermined conversion constant.

30 parts by weight of the resultant mixture was charged into a strong-blending double-screw extruder having an inner diameter of 58 mm and L/D of 52.5, and 70 parts by weigh of liquid paraffin (50 cSt at 40° C.) was supplied to the double-screw extruder via a side feeder. Melt-blending was conducted at 230° C. and 250 rpm to prepare a first polyolefin solution.

(2) Preparation of Second Polyolefin Solution

A second polyolefin solution was prepared in the same manner as above, except that a dry-blend of 99.8 parts by weight of a resin component comprising 70 wt. % of HDPE (melting points: 135° C., crystal dispersion temperature: 100° C.) and 30 wt. % of PP; and 0.2 parts by weight of the above antioxidant was used, and that the resin concentration was 35 wt. %.

(3) Production of Membrane

The first and second polyolefin solutions were supplied from their double-screw extruders to a three-layer-extruding T-die, and extruded therefrom to form an extrudate (also called a laminate) of first polyolefin solution layer/second polyolefin solution layer/first polyolefin solution layer at a layer thickness ratio of 35/30/35. The extrudate was cooled while passing through cooling rollers controlled at 0° C., to form a three-layer, gel-like sheet, which was simultaneously biaxially stretched at 115° C. to a magnification of 5 fold in both machine (longitudinal) and transverse directions by a tenter-stretching machine. The stretched three-layer, gel-like sheet was fixed to an aluminum frame plate of 20 cm×20 cm, immersed in a methylene chloride bath controlled at 25° C. to remove the liquid paraffin while vibrating at 100 rpm for 3 minutes. The washed membrane was dried by air at room temperature, fixed to a tenter, and annealed at 125° C. for 10 minutes to produce a three-layer, microporous polyolefin membrane, in which the total amount of the polyethylene was 87.5 wt. %, based on the weight of the three-layer microporous polyolefin membrane.

(4) Production of Lithium Secondary Battery (a) Production of Cathode 87 parts by weight of composite lithium-cobalt oxide ($LiCoO_2$), 10 parts by weight of flake graphite, and 3 parts by weight of polyvinylidene fluoride (PVDF) were added to N-methyl-2-pyrrolidone, and fully mixed by stirring for 1 hour to prepare a cathodic active material paste.

The cathodic active material was applied to an aluminum foil current collector by a doctor blade method to form a uniform-thickness layer, which was dried to a cathodic active material layer. The resultant laminate was punched to a 14-mm-diameter circle, to obtain a cathode comprising the cathodic active material layer formed on the current collector.

(b) Production of Anode 95 parts by weight of mesophase carbon microbeads and 5 parts by weight of PVDF were added to N-methyl-2-pyrrolidone, and fully mixed to prepare an anodic active material paste. The anodic active material was applied to a copper foil current collector by a doctor blade method to form a uniform-thickness layer, which was dried to obtain an anodic active material layer. The resultant laminate was punched to a 14-mm-diameter circle to obtain an anode comprising the anodic active material layer formed on the current collector.

(c) Preparation of Electrolytic Solution 1 mol/liter of $LiPF_6$ was added to a mixed solvent of ethylene carbonate (EC) and diethyl carbonate (DEC) at a volume ratio of 30/70 to prepare an electrolytic solution.

(d) Assembling of Battery

The cathode and the anode were heated at a temperature of 150° C. under reduced pressure, to substantially completely remove moisture and N-methyl-2-pyrrolidone from the electrodes. The dried cathode and anode were respectively attached (welded) to a cathode casing and an anode casing, such that they sandwiched a separator formed by the three-layer, microporous polyolefin membrane produced in the above step (3). After pouring the electrolytic solution, a gasket was sealed to provide a coin-shaped lithium secondary battery.

Example 2

(1) Production of First Microporous Polyolefin Membrane

A first polyolefin solution prepared in the same manner as in Example 1 was extruded from a T-die mounted to a tip end of the double-screw extruder, cooled by cooling rollers controlled at 0° C. while reeling up, to form a first gel-like sheet, which was simultaneously biaxially stretched at 115° C., washed, dried by air, and annealed in the same manner as in Example 1 to produce a first microporous polyolefin membrane having a thickness of 18.1 µm.

(2) Production of Second Microporous Polyolefin Membrane

A gel-like sheet formed in the same manner as in the step (1) above except for using a second polyolefin solution prepared in the same manner as in Example 1 was simultaneously biaxially stretched at 115° C., washed, dried by air, and annealed in the same manner as in Example 1 to produce a second microporous polyolefin membrane having a thickness of 15.5 µm.

(3) Lamination

The first and second microporous polyolefin membranes were laminated in an order of first microporous polyolefin membrane/second microporous polyolefin membrane/first microporous polyolefin membrane at a layer thickness ratio of 35/30/35, caused to pass through multi-stage rollers heated to a roller temperature of 110° C., press-bonded at 0.05 MPa, and stretched to a magnification of 1.6 fold in both machine and transverse directions. The layer thickness ratio was measured as follows: a sample portion of the three-layer, microporous polyolefin membrane was peeled to obtain three membranes, and the thickness of each membranes was measured by a contact thickness meter at 10-mm longitudinal direction intervals over the width of 30 cm, and averaged. The remainder of the three-layer, microporous polyolefin membrane was annealed in the following step.

(4) Annealing

The resultant laminate polyolefin membrane was fixed to a tenter, and annealed at 125° C. for 10 minutes to produce a three-layer, microporous polyolefin membrane, in which the total amount of the polyethylene was 87.5 wt. %, based on the weight of the three-layer, microporous polyolefin membrane.

(5) Production of Lithium Secondary Battery

A lithium secondary battery was produced using the three-layer, microporous polyolefin membrane in the same manner as in Example 1.

Example 3

A first polyolefin solution was prepared in the same manner as in Example 1, except that the first polyolefin resin comprised 8 wt. % of UHMWPE, 90 wt. % of HDPE and 2 wt. % of PP. A second polyolefin solution was prepared in the same manner as in Example 1. The first and second polyolefin solutions were supplied from their double-screw extruders to a three-layer-extruding T-die, and extruded therefrom to form an extrudate of first polyolefin solution layer/second polyolefin solution layer/first polyolefin solution layer at a layer thickness ratio of 30/40/30, and cooled by cooling rollers controlled at 0° C. while reeling up, to form a three-layer, gel-like sheet. The three-layer, gel-like sheet was simultaneously biaxially stretched at 115° C., washed, dried by air, and annealed in the same manner as in Example 1 to form a three-layer, microporous polyolefin membrane, in which the total amount of the polyethylene was 86.8 wt. %, based on the weight of the three-layer, microporous polyolefin membrane. A lithium secondary battery was produced using the three-layer, microporous polyolefin membrane in the same manner as in Example 1.

Example 4

A first polyolefin solution was prepared in the same manner as in Example 1, except that the first polyolefin resin comprised 10 wt. % of UHMWPE, 80 wt. % of HDPE and 10 wt. % of PP. A second polyolefin solution was prepared in the same manner as in Example 1, except that the second polyolefin resin comprised 80 wt. % of HDPE and 20 wt. % of PP. The first and second polyolefin solutions were supplied from their double-screw extruders to a three-layer-extruding T-die, and extruded therefrom to form a extrudate of first polyolefin solution layer/second polyolefin solution layer/first polyolefin solution layer at a layer thickness ratio of 30/40/30, and cooled by cooling rollers controlled at 0° C. while reeling up, to form a three-layer, gel-like sheet. The three-layer, gel-like sheet was simultaneously biaxially stretched at 115° C., washed, dried by air, and annealed in the same manner as in Example 1 to form a three-layer, microporous polyolefin membrane, in which the total amount of the polyethylene was 86.0%, based on the weight of the three-layer, microporous polyolefin membrane. A lithium secondary battery was produced using the three-layer, microporous polyolefin membrane in the same manner as in Example 1.

Example 5

First and second polyolefin solutions prepared in the same manner as in Example 3 were supplied from their double-screw extruders to a two-layer-extruding T-die, and simultaneously extruded therefrom at a layer thickness ratio of first polyolefin solution layer/second polyolefin solution layer=70/30, cooled by cooling rolls controlled at 0° C. while reeling up, to form a two-layer, gel-like sheet. The two-layer, gel-like sheet was simultaneously biaxially stretched at 115° C., washed, dried by air, and annealed in the same manner as in Example 1 to form a two-layer, microporous polyolefin membrane, in which the total amount of the polyethylene was 89.6 wt. %, based on the weight of the two-layer, microporous polyolefin membrane. A lithium secondary battery was produced using the two-layer, microporous polyolefin membrane in the same manner as in Example 1.

Comparative Example 1

(1) Preparation of a First Polyolefin Solution

A first polyolefin solution was prepared in the same manner as in Example 1, except for using a polyethylene resin comprising 10 wt. % of UHMWPE and 90 wt. % of HDPE. No polypropylene was used in the first polyolefin solution.

(2) Preparation of a Second Polyolefin Solution

A second polyolefin solution was prepared having the same polyolefin resin as the second polyolefin solution in Example 1.

(3) Production of Membrane

The first and second polyolefin solutions were supplied from their double-screw extruders to a three-layer-extruding T-die, and extruded therefrom to form an extrudate of first polyolefin solution/second polyolefin solution/first polyolefin solution at a layer thickness ratio of 30/40/30, and cooled while passing through cooling rollers controlled at 0° C., to form a three-layer, gel-like sheet of first polyolefin layer/second polyolefin layer/first polyolefin layer. The three-layer, gel-like sheet was simultaneously biaxially stretched at 115° C., washed, dried by air, and annealed in the same manner as in Example 1, to form a three-layer, microporous polyolefin membrane, in which the total amount of the polyethylene was 88.0%, based on the weight of the three-layer, microporous polyolefin membrane.

(4) Production of Lithium Secondary Battery

A lithium secondary battery was produced using the three-layer, microporous polyolefin membrane in the same manner as in Example 1.

Comparative Example 2

(1) Preparation of a First Polyolefin Solution

A first polyolefin solution in Comparative Example 2 having the same composition as that of the first polyolefin solution in Example 3 was prepared.

(2) Preparation of a Second Polyolefin Solution

A second polyolefin solution in Comparative Example 2 was prepared in the same manner as in Example 1, except for using a polyolefin resin composition comprising 30 wt. % of HDPE and 70 wt. % of PP.

(3) Production of Membrane

A three-layer, microporous polyolefin membrane of first microporous polyolefin membrane/second microporous polyolefin membrane/first microporous polyolefin membrane, in which the total amount of the polyethylene was 70.8%, based on the weight of the three-layer, microporous polyolefin membrane, was produced in the same manner as in Comparative Example 1 except for using the above first and second polyolefin solutions.

(4) Production of Lithium Secondary Battery

A lithium secondary battery was produced using the three-layer, microporous polyolefin membrane in the same manner as in Example 1.

Comparative Example 3

(1) Preparation of a First Polyolefin Solution

A first polyolefin solution in Comparative Example 3 having the same composition as that of the first polyolefin solution in Example 4 was prepared.

(2) Preparation of a Second Polyolefin Solution

A second polyolefin solution in Comparative Example 3 was prepared in the same manner as in Comparative Example 1, except for using a second polyolefin resin comprising 50 wt. % of HDPE and 50 wt. % of PP, based on the weight of the second polyolefin resin.

(3) Production of Membrane

A three-layer, microporous polyolefin membrane of first microporous layer/second microporous layer/first microporous layer, in which the total amount of the polyethylene was 58 wt. %, based on the weight of the three-layer, microporous polyolefin membrane, was produced in the same manner as in Comparative Example 1, except for using the above first and second polyolefin solutions at a layer thickness ratio of first polyolefin solution layer/second polyolefin solution layer/first polyolefin solution layer=10/80/10.

(4) Production of Lithium Secondary Battery

A lithium secondary battery was produced using the three-layer, microporous polyolefin membrane in the same manner as in Example 1.

Comparative Example 4

A three-layer, microporous polyolefin membrane of first microporous membrane/second microporous membrane/first microporous membrane, in which the total amount of the polyethylene was 95.6 wt. %, based on the weight of the three-layer microporous polyolefin membrane, was produced in the same manner as in Comparative Example 2, except that the second polyolefin composition comprised 92 wt. % of HDPE and 8 wt. % of PP, based on the second polyolefin composition. A lithium secondary battery was produced using the three-layer, microporous polyolefin membrane in the same manner as in Example 1.

Comparative Example 5

A three-layer, microporous polyolefin membrane comprising a first microporous polyolefin membrane/a second microporous polyolefin membrane/a first microporous polyolefin membrane, in which the total amount of the polyethylene was 73.0 wt. % based on the weight of the three-layer, microporous polyolefin membrane, was produced in the same manner as in Comparative Example 1, except that the first polyolefin comprised 5 wt. % of UHMWPE, 70 wt. % of HDPE and 25 wt. % of PP, based on the weight of the first polyolefin resin. A lithium secondary battery was produced using the three-layer, microporous polyolefin membrane in the same manner as in Example 1.

Comparative Example 6

(1) Preparation of a First Polyolefin Solution

A first polyolefin solution was prepared in the same manner as in Comparative Example 1, except for using a polyolefin composition comprising 5 wt. % of UHMWPE, 80 wt. % of HDPE and 15 wt. % of PP, based on the weight of the first polyolefin.

(2) Preparation of a Second Polyolefin Solution

A second polyolefin solution having the same composition as in the step (1) above was prepared.

(3) Production of Membrane

A three-layer, microporous polyolefin membrane comprising a first microporous polyolefin membrane/second microporous polyolefin membrane/first microporous polyolefin membrane, in which the total amount of the polyethylene was 85.0 wt. %, based on the weight of the three-layer, microporous polyolefin membrane, was produced in the same manner as in Comparative Example 1 except for using the above first and second polyolefin solutions.

(4) Production of Lithium Secondary Battery

A lithium secondary battery was produced using the three-layer, microporous polyolefin membrane in the same manner as in Example 1.

Properties

The properties of the multi-layer, microporous polyolefin membranes obtained in Examples 1-5 and Comparative Examples 1-6 were measured by the following methods. The results are shown in Tables 1 and 2.

(1) Average Thickness (μm)

The thickness of each multi-layer, microporous membrane was measured by a contact thickness meter at 5 mm longitudinal direction intervals over the width of 30 cm, and averaged.

(2) Air Permeability (sec/100 cm³/20 μm)

Air permeability $P_1$ measured on each multi-layer, microporous membrane having a thickness $T_1$ according to JIS P8117 was converted to air permeability $P_2$ at a thickness of 20 μm by the equation of $P_2=(P_1\times20)/T_1$.

(3) Porosity (%)

Measured by a conventional weight method, e.g., by comparing the relative densities of a non-porous membrane to a porous membrane of the same mass.

(4) Pin Puncture Strength (mN/20 μm)

The maximum load was measured, when each multi-layer, microporous membrane having a thickness of $T_1$ was pricked with a needle of 1 mm in diameter with a spherical end surface (radius R of curvature: 0.5 mm) at a speed of 2 mm/second. The measured maximum load $L_1$ was converted to the maximum load $L_2$ at a thickness of 20 μm by the equation of $L_2=(L_1\times20)/T_1$, and used as pin puncture strength.

(5) Tensile Strength and Tensile Elongation

Measured on a rectangular test piece having a width of 10 mm according to ASTM D882.

(6) Heat Shrinkage Ratio (%)

The shrinkage ratio of each multi-layer, microporous membrane was measured three times in both longitudinal and transverse directions after maintaining a membrane temperature 105° C. for 8 hours, and averaging the measured shrinkages.

(7) Shutdown Temperature

As shown in FIG. 1, a test piece TP having a size of 3 mm and 10 mm in the stretching directions MD and TD, respectively, is cut out of a microporous polyethylene membrane 1. Using a thermomechanical analyzer (TMA/SS6000 available from Seiko Instruments Inc.), the test piece TP is heated from room temperature at a speed of 5° C./minute, with its upper end 1a gripped by a holder 2 and a weight 3 of 2 g attached to its lower end 1b. A temperature at a point of inflection observed near the melting point was defined as shutdown temperature.

(8) Shutdown Speed

A multi-layer, microporous membrane was fixed to a plate controlled at 135° C. in a surface contact manner, and heat-treated. Such heat treatment was conducted on pluralities of multi-layer, microporous membranes with contact time varied. These multi-layer, microporous membranes were measured with respect to air permeability. The time period (in seconds) that elapsed until the air permeability (converted to the level at 20-μm thickness) reached 100,000 seconds/100 cm³ was defined as shutdown speed.

(9) Meltdown Temperature (° C.)

Using the above thermomechanical analyzer, a test piece TP of 10 mm (TD) and 3 mm (MD) was heated from room temperature at a speed of 5° C./minute under a load of 2 g according to the method shown in FIG. 1. The temperature at which the test piece TP elongated by 50% of its length (100%) at room temperature was used as "meltdown temperature."

(10) Thickness Variation Ratio

The thickness variation ratio (%) was obtained by measuring the thickness of the multi-layer, microporous membrane by a contact thickness meter at a 5-mm interval over the length of 30 cm in a transverse direction, and calculating the following equation:

Thickness variation ratio (%)=[(maximum thickness)−(minimum thickness)/(average thickness)]×100.

(11) Capacity Recovery Ratio (High-Temperature Retention Properties) of Lithium Secondary Battery The capacity recovery ratio of the lithium ion battery was measured as follows. First, the discharge capacity (initial capacity) of the lithium ion battery was measured by a charge/discharge tester before high-temperature storing. After being stored at a temperature of 80° C. for 30 days, the discharge capacity was measured again by the same method to obtain the capacity after high-temperature storing. The capacity recovery ratio (%) of the battery was determined by the following equation:

Capacity recovery ratio (%)=[(capacity after high-temperature storing)/(initial capacity)]×100.

TABLE 1

| | No. | | |
|---|---|---|---|
| | Example 1 | Example 2 | Example 3 |
| Polyolefin | | | |
| First Polyolefin | | | |
| UHMWPE Mw/% by mass | $2.0\times10^6/5$ | $2.0\times10^6/5$ | $2.0\times10^6/8$ |
| HDPE Mw/% by mass | $3.5\times10^5/90$ | $3.5\times10^5/90$ | $3.5\times10^5/90$ |
| PP Mw/% by mass | $5.3\times10^5/5$ | $5.3\times10^5/5$ | $5.3\times10^5/2$ |
| Tm[1]/Tcd[2] (° C.) of PE composition | 135/100 | 135/100 | 135/100 |
| Second Polyolefin | | | |
| UHMWPE Mw/% by mass | —/— | —/— | —/— |
| HDPE Mw/% by mass | $3.5\times10^5/70$ | $3.5\times10^5/70$ | $3.5\times10^5/70$ |
| PP Mw/% by mass | $5.3\times10^5/30$ | $5.3\times10^5/30$ | $5.3\times10^5/30$ |
| Tm[1]/Tcd[2] (° C.) of PE(composition) | 135/100 | 135/100 | 135/100 |
| Total of PE Resin (% by mass)[3] | 86.7 | 86.7 | 85.75 |
| Production Conditions | | | |
| Concentration[4] (% by mass) Extrudate | 30/35 | 30/35 | 30/35 |
| Layer Structure | (I)/(II)/(I)[5] | — | (I)/(II)/(I) |
| Layer Thickness Ratio | 35/30/35 | — | 30/40/30 |
| Stretching Multi-Layer, Gel-Like Sheet | | | |
| Temperature (° C.)/Magnification (MD × TD)[6] First Gel-Like Sheet | 115/5 × 5 | —/— | 115/5 × 5 |
| Temperature (° C.)/Magnification (MD × TD)[6] Second Gel-Like Sheet | —/— | 115/5 × 5 | —/— |

TABLE 1-continued

|  |  |  |  |
|---|---|---|---|
| Temperature (° C.)/Magnification (MD × TD)[6] Lamination | —/— | 115/5 × 5 | —/— |
| Temperature (° C.)/Pressure (MPa) | —/— | 110/0.05 | —/— |
| Magnification (MD × TD)[6] | — | 1.6 × 1.6 | — |
| Layer Structure | — | (I)/(II)/(I) | — |
| Layer Thickness Ratio Annealing | — | 35/30/35 | — |
| Temperature (° C.)/Time (minute) | 125/10 | 125/10 | 125/10 |
| Properties of Multi-Layer, Microporous Membrane | | | |
| Average thickness (μm) | 19.8 | 20.2 | 20.1 |
| Air Permeability (sec/100 cm$^3$/20 μm) | 280 | 300 | 290 |
| Porosity (%) | 43 | 41 | 43 |
| Pin Puncture Strength (mN/20 μm) | 2,744 | 2646 | 2,842 |
| Tensile Strength (kPa) | | | |
| MD | 121,520 | 125,440 | 120,540 |
| TD | 112,700 | 114,660 | 109,760 |
| Tensile Elongation (%) in MD/TD | 110/130 | 100/120 | 120/140 |
| Heat Shrinkage Ratio (%) in MD/TD | 4/3 | 3/2 | 4/3 |
| Shutdown Speed (second) | 5 | 5 | 4 |
| Shutdown Temperature (° C.) | 133 | 133 | 131 |
| Meltdown Temperature (° C.) | 173 | 172 | 172 |
| Thickness Variation Ratio (%) | 5 | 5 | 5 |
| Capacity Recovery Ratio (%) of Battery | 81 | 80 | 78 |

|  | No. | |
|---|---|---|
|  | Example 4 | Example 5 |
| Polyolefin | | |
| First Polyolefin | | |
| UHMWPE  Mw/% by mass | 2.0 × 10$^6$/10 | 2.0 × 10$^6$/8 |
| HDPE  Mw/% by mass | 3.5 × 10$^5$/80 | 3.5 × 10$^5$/90 |
| PP  Mw/% by mass | 5.3 × 10$^5$/10 | 5.3 × 10$^5$/2 |
| Tm[1]/Tcd[2] (° C.) of PE composition | 135/100 | 135/100 |
| Second Polyolefin | | |
| UHMWPE  Mw/% by mass | —/— | —/— |
| HDPE  Mw/% by mass | 3.5 × 10$^5$/80 | 3.5 × 10$^5$/70 |
| PP  Mw/% by mass | 5.3 × 10$^5$/20 | 5.3 × 10$^5$/30 |
| Tm[1]/Tcd[2] (° C.) of PE(composition) | 135/100 | 135/100 |
| Total of PE Resin (% by mass)[3] | 86.0 | 89.6 |
| Production Conditions | | |
| Concentration[4] (% by mass) | 30/35 | 30/35 |
| Extrudate | | |
| Layer Structure | (I)/(II)/(I) | (I)/(II) |
| Layer Thickness Ratio | 30/40/30 | 70/30 |
| Stretching Multi-Layer, Gel-Like Sheet | | |
| Temperature (° C.)/Magnification (MD × TD)[6] First Gel-Like Sheet | 115/5 × 5 | 115/5 × 5 |
| Temperature (° C.)/Magnification (MD × TD)[6] Second Gel-Like Sheet | —/— | —/— |
| Temperature (° C.)/Magnification (MD × TD)[6] Lamination | —/— | —/— |
| Temperature (° C.)/Pressure (MPa) | —/— | —/— |
| Magnification (MD × TD)[6] | — | — |
| Layer Structure | — | — |
| Layer Thickness Ratio Annealing | — | — |
| Temperature (° C.)/Time (minute) | 125/10 | 125/10 |
| Properties of Multi-Layer, Microporous Membrane | | |
| Average thickness (μm) | 19.9 | 20.2 |
| Air Permeability (sec/100 cm$^3$/20 μm) | 280 | 290 |
| Porosity (%) | 42 | 41 |
| Pin Puncture Strength (mN/20 μm) | 2,940 | 3,626 |

TABLE 1-continued

| Tensile Strength (kPa) | | |
|---|---|---|
| MD | 133,280 | 138,180 |
| TD | 122,500 | 125,440 |
| Tensile Elongation (%) in MD/TD | 110/140 | 120/140 |
| Heat Shrinkage Ratio (%) in MD/TD | 3/2 | 5/4 |
| Shutdown Speed (second) | 5 | 2 |
| Shutdown Temperature (° C.) | 135 | 132 |
| Meltdown Temperature (° C.) | 173 | 170 |
| Thickness Variation Ratio (%) | 4 | 5 |
| Capacity Recovery Ratio (%) of Battery | 80 | 77 |

Note:
[1] Tm represents the melting point of polyethylene (composition).
[2] Tcd represents the crystal dispersion temperature of polyethylene (composition).
[3] The total amount of the polyethylene resin in the first and second microporous layers, based on 100% by mass of the entire membrane.
[4] The concentrations of the first and second polyolefins.
[5] (I) and (II) represent the first and second polyolefins, respectively.
[6] MD represents a longitudinal direction, and TD represents a transverse direction.

TABLE 2

| | No. | | |
|---|---|---|---|
| | Com. Ex. 1 | Com. Ex. 2 | Com. Ex. 3 |
| Polyolefin | | | |
| First Polyolefin | | | |
| UHMWPE Mw/% by mass | $2.0 \times 10^6/10$ | $2.0 \times 10^6/8$ | $2.0 \times 10^6/10$ |
| HDPE Mw/% by mass | $3.5 \times 10^5/90$ | $3.5 \times 10^5/90$ | $3.5 \times 10^5/80$ |
| PP Mw/% by mass | —/— | $5.3 \times 10^5/2$ | $5.3 \times 10^5/10$ |
| $Tm^{(1)}/Tcd^{(2)}$ (° C.) of PE composition | 135/100 | 135/100 | 135/100 |
| Second Polyolefin | | | |
| UHMWPE Mw/% by mass | —/— | —/— | —/— |
| HDPE Mw/% by mass | $3.5 \times 10^5/70$ | $3.5 \times 10^5/30$ | $3.5 \times 10^5/50$ |
| PP Mw/% by mass | $5.3 \times 10^5/30$ | $5.3 \times 10^5/70$ | $5.3 \times 10^5/50$ |
| $Tm^{(1)}/Tcd^{(2)}$ (° C.) of PE(composition) | 135/100 | 135/100 | 135/100 |
| Total of PE Resin (% by mass)$^{(3)}$ | 86.88 | 68.25 | 57.06 |
| Production Conditions | | | |
| Concentration$^{(4)}$ (% by mass) | 30/35 | 30/35 | 30/35 |
| Extrudate | | | |
| Layer Structure | (I)/(II)/(I) | (I)/(II)/(I) | (I)/(II)/(I) |
| Layer Thickness Ratio | 30/40/30 | 30/40/30 | 10/80/10 |
| Stretching | | | |
| Multi-Layer, Gel-Like Sheet | | | |
| Temperature (° C.)/Magnification (MD × TD)$^{(6)}$ | 115/5 × 5 | 115/5 × 5 | 115/5 × 5 |
| First Gel-Like Sheet | | | |
| Temperature (° C.)/Magnification (MD × TD)$^{(6)}$ | —/— | —/— | —/— |
| Second Gel-Like Sheet | | | |
| Temperature (° C.)/Magnification (MD × TD)$^{(6)}$ | —/— | —/— | —/— |
| Lamination | | | |
| Temperature (° C.)/Pressure (MPa) | —/— | —/— | —/— |
| Magnification (MD × TD) | — | — | — |
| Layer Structure | — | — | — |
| Layer Thickness Ratio | — | — | — |
| Annealing | | | |
| Temperature (° C.)/Time (minute) | 125/10 | 125/10 | 125/10 |
| Properties of Multi-Layer, Microporous Membrane | | | |
| Average thickness (μm) | 20.3 | 20.0 | 19.8 |
| Air Permeability (sec/100 cm$^3$/20 μm) | 290 | 1,200 | 1,100 |
| Porosity (%) | 40 | 36 | 38 |
| Pin Puncture Strength (mN/20 μm) | 2,842 | 2,058 | 1,960 |
| Tensile Strength (kPa) | | | |
| MD | 124,460 | 93,100 | 88,200 |
| TD | 112,700 | 88,200 | 83,300 |
| Tensile Elongation (%) in MD/TD | 100/120 | 80/110 | 80/90 |

TABLE 2-continued

| | | | |
|---|---|---|---|
| Heat Shrinkage Ratio (%) in MD/TD | 4/3 | 4/2 | 3/2 |
| Shutdown Speed (second) | 3 | 4 | 9 |
| Shutdown Temperature (° C.) | 130 | 133 | 136 |
| Meltdown Temperature (° C.) | 174 | 180 | 179 |
| Thickness Variation Ratio (%) | 5 | 15 | 10 |
| Capacity Recovery Ratio (%) of Battery | 64 | 69 | 72 |

| | No. | | |
|---|---|---|---|
| | Com. Ex. 4 | Com. Ex. 5 | Com. Ex. 6 |
| Polyolefin | | | |
| First Polyolefin | | | |
| UHMWPE   Mw/% by mass | $2.0 \times 10^6/8$ | $2.0 \times 10^6/5$ | $2.0 \times 10^6/5$ |
| HDPE   Mw/% by mass | $3.5 \times 10^5/90$ | $3.5 \times 10^5/70$ | $3.5 \times 10^5/80$ |
| PP   Mw/% by mass | $5.3 \times 10^5/2$ | $5.3 \times 10^5/25$ | $5.3 \times 10^5/15$ |
| $Tm^{(1)}/Tcd^{(2)}$ (° C.) of PE composition | 135/100 | 135/100 | 135/100 |
| Second Polyolefin | | | |
| UHMWPE   Mw/% by mass | —/— | —/— | $2.0 \times 10^6/5$ |
| HDPE   Mw/% by mass | $3.5 \times 10^5/92$ | $3.5 \times 10^5/70$ | $3.5 \times 10^5/80$ |
| PP   Mw/% by mass | $5.3 \times 10^5/8$ | $5.3 \times 10^5/30$ | $5.3 \times 10^5/15$ |
| $Tm^{(1)}/Tcd^{(2)}$ (° C.) of PE(composition) | 135/100 | 135/100 | 135/100 |
| Total of PE Resin (% by mass)$^{(3)}$ | 95.38 | 72.81 | 85.0 |
| Production Conditions | | | |
| Concentration$^{(4)}$ (% by mass) | 30/35 | 30/35 | 30/35 |
| Extrudate | | | |
| Layer Structure | (I)/(II)/(I) | (I)/(II)/(I) | (I)/(II)/(I) |
| Layer Thickness Ratio | 30/40/30 | 30/40/30 | 30/40/30 |
| Stretching | | | |
| Multi-Layer, Gel-Like Sheet | | | |
| Temperature (° C.)/Magnification (MD × TD)$^{(6)}$ | 115/5 × 5 | 115/5 × 5 | 115/5 × 5 |
| First Gel-Like Sheet | | | |
| Temperature (° C.)/Magnification (MD × TD)$^{(6)}$ | —/— | —/— | —/— |
| Second Gel-Like Sheet | | | |
| Temperature (° C.)/Magnification (MD × TD)$^{(6)}$ | —/— | —/— | —/— |
| Lamination | | | |
| Temperature (° C.)/Pressure (MPa) | —/— | —/— | —/— |
| Magnification (MD × TD) | — | — | — |
| Layer Structure | — | — | — |
| Layer Thickness Ratio | — | — | — |
| Annealing | | | |
| Temperature (° C.)/Time (minute) | 125/10 | 125/10 | 125/10 |
| Properties of Multi-Layer, Microporous Membrane | | | |
| Average thickness (μm) | 20.3 | 19.8 | 20 |
| Air Permeability (sec/100 cm³/20 μm) | 320 | 270 | 250 |
| Porosity (%) | 39 | 44 | 43 |
| Pin Puncture Strength (mN/20 μm) | 3,430 | 2,548 | 2,254 |
| Tensile Strength (kPa) | | | |
| MD | 134,260 | 113,680 | 117,600 |
| TD | 120,540 | 106,820 | 105,840 |
| Tensile Elongation (%) in MD/TD | 140/220 | 90/110 | 80/100 |
| Heat Shrinkage Ratio (%) in MD/TD | 7/6 | 7/5 | 6/4 |
| Shutdown Speed (second) | 2 | 12 | 12 |
| Shutdown Temperature (° C.) | 132 | 138 | 136 |
| Meltdown Temperature (° C.) | 156 | 177 | 168 |
| Thickness Variation Ratio (%) | 3 | 5 | 4 |
| Capacity Recovery Ratio (%) of Battery | 62 | 82 | 80 |

Note:
$^{(1)}$Tm represents the melting point of polyethylene (composition).
$^{(2)}$Tcd represents the crystal dispersion temperature of polyethylene (composition).
$^{(3)}$The total amount of the polyethylene resin in the first and second microporous layers, based on 100% by mass of the entire membrane.
$^{(4)}$The concentrations of the first and second polyolefins.
$^{(5)}$(I) and (II) represent the first and second polyolefins, respectively.
$^{(6)}$MD represents a longitudinal direction, and TD represents a transverse direction.

Table 1 shows that the multi-layer, microporous membranes of Examples 1-5 have well-balanced air permeability, pin puncture strength, tensile strength, tensile elongation, shutdown temperature, shutdown speed and meltdown temperature, particularly well-balanced shutdown temperature, shutdown speed and meltdown temperature. Lithium secondary batteries comprising the multi-layer, microporous membranes of Examples 1-5 have capacity recovery ratios of 75% or more, indicating desirable high-temperature retention properties.

It is clear from Table 2 that the multi-layer, microporous membrane of Comparative Example 1 was poorer in high-temperature retention (capacity recovery ratio) properties than those of Examples 1-5. It is believed that this is the case because the percentage of the first microporous layer did not contain polypropylene, even though the percentage of polyethylene in the second microporous layer was in a range of 50 wt. % to 85 wt. %, based on the weight of the second microporous layer material. The multi-layer, microporous membrane of Comparative Example 2 was clearly poorer in air permeability than those of Examples 1-5. It is believed that this is the case because the percentage of the polyethylene in the second microporous layer was as low as 30 wt. %, based on the weight of the second microporous layer material, even though the percentage of the polyethylene in the first microporous layer was in a range of 80 wt. % to 99.5 wt. %, based on the weight of the first microporous layer material. The multi-layer, microporous membrane of Comparative Example 3 was poorer in air permeability, pin puncture strength and tensile elongation than those of Examples 1-5. It is believed that this is the case because the total amount of the polyethylene in the first and second microporous layers was less than 61 wt. %, based on the weight of the multi-layer, microporous polyolefin membrane, despite the fact that the percentage of polyethylene in the first microporous layer was 80 to 99.5 wt. %, and more polyethylene was present in the first than in the second microporous layer. The multi-layer, microporous membrane of Comparative Example 4 was poorer in meltdown properties and high-temperature storage properties than those of Examples 1-5. It is believed that this is the case because the total amount of the polyethylene in the multi-layer, microporous polyolefin membrane was more than 95 wt. %, based on the weight of multi-layer, microporous polyolefin membrane. The multi-layer, microporous membrane of Comparative Example 5 was higher in a shutdown temperature and slower in a shutdown speed than those of Examples 1-5. It is believed that this is the case because the percentage of the polyethylene in both first and second microporous layers was less than 80 wt. %, based on the weight of both first and second microporous layers. The multi-layer, microporous membrane of Comparative Example 6 was higher in a shutdown temperature and poorer shutdown speed and poorer meltdown temperature than those of Examples 1-5. It is believed that this is the case because the polyethylene content in both first and second microporous layers was 85 wt. %, based on the weight of both the first and second microporous layer material.

Finally, we will describe several embodiments of this invention.

[1] A multi-layer, microporous polyolefin membrane, comprising:
a first layer material and a second layer material, the first and second layer materials comprising polyethylene and polypropylene, wherein
  (i) the first layer material contains polyethylene in a first amount of at least about 80 wt. %, based on the weight of the first material;
  (ii) the second layer material contains polyethylene in a second amount of at least about 50 wt. %, based on the weight of the second material;
  (iii) the first amount is greater than the second amount on a weight percent basis, and
  (iv) the multi-layer, microporous polyolefin membrane contains polyethylene in a total amount of at least about 61 wt. %, based on the combined weight of the first and second layer materials.

[2] The multi-layer membrane of [1], wherein the multi-layer membrane comprises a first microporous layer containing the first layer material and a second microporous layer containing the second layer material.

[3] The multi-layer membrane of [1], wherein the multi-layer membrane comprises:
  a first microporous layer containing the first layer material, a third microporous layer containing the first layer material, and a second microporous layer containing the second layer material, the second microporous layer being located between the first and second microporous layers.

[4] The multi-layer membrane of [1], wherein the multi-layer membrane comprises:
  a first microporous layer containing the second layer material, a third microporous layer containing the second layer material, and a second microporous layer containing the first layer material, the second microporous layer being located between the first and third microporous layers.

[5] The multi-layer membrane of [2], [3], or [4], wherein the first amount ranges from about 80 wt. % to about 99.5 wt. %, the second amount ranges from about 50 wt. % to about 85 wt. %, the first layer material contains at least about 5 wt. % more polyethylene than the second layer material based on the weights of the first and second layer material s, and the total amount is in the range of about 70 wt. % to about 90 wt. %.

[6] The multi-layer membrane of [2] though [5] wherein the polyethylene comprises a first polyethylene and optionally a second polyethylene, wherein
  (a) the polyethylene in first layer material is characterized by at least one of:
    (1) the polyethylene has a Mw in the range of about $1 \times 10^4$ to about $1 \times 10^7$;
    (2) the polyethylene comprises a first polyethylene having an Mw ranging from about $1 \times 10^4$ to about $5 \times 10^5$;
    (3) the first polyethylene is one or more of a high-density polyethylene, a medium-density polyethylene, a branched low-density polyethylene, or a linear low-density polyethylene;
    (4) the first polyethylene is at least one of (i) an ethylene homopolymer or (ii) a copolymer of ethylene and a third α-olefin selected from the group of propylene, butene-1, hexene-1;
    (5) the polyethylene comprises the first polyethylene and a second polyethylene, wherein the second polyethylene has an Mw of at least about $1 \times 10^6$;
    (6) the second polyethylene is at least one of (i) an ethylene homopolymer or (ii) a copolymer of ethylene and a fourth α-olefin selected from the group of propylene, butene-1, hexene-1;
    (7) the amount of the second polyethylene is no more than about 15 wt. %, based on the weight of the first layer material;
    (8) the polyethylene has a molecular weight distribution ("Mw/Mn") of about 5 to about 300;
  (b) the polypropylene in the first and/or second layer materials is characterized by at least one of:

(1) the polypropylene is one or more of (i) a propylene homopolymer or (ii) a copolymer of propylene and a fifth olefins selected from one or more of α-olefins such as ethylene, butene-1, pentene-1, hexene-1,4-methylpentene-1, octene-1, vinyl acetate, methyl methacrylate, styrene, butadiene, 1,5-hexadiene, 1,7-octadiene and 1,9-decadiene;
(2) the polypropylene has an Mw ranging from about $1 \times 10^4$ to about $4 \times 10^6$;
(3) the polypropylene has an Mw/Mn ranging from about 1.01 to about 100;
(4) the polypropylene is isotactic;
(5) the polypropylene has a heat of fusion of at least about 90 Joules/gram;
(6) The polypropylene has a melting peak (second melt) of at least about 160° C.; and
(c) the polyethylene in the second layer material is characterized by at least one of:
(1) the polyethylene has an Mw in the range of about $1 \times 10^4$ to about $1 \times 10^7$;
(2) the polyethylene comprises a first polyethylene having an Mw ranging from about $1 \times 10^4$ to about $5 \times 10^5$;
(3) the first polyethylene is one or more of a high-density polyethylene, a medium-density polyethylene, a branched low-density polyethylene, or a linear low-density polyethylene;
(4) the first polyethylene is at least one of (i) an ethylene homopolymer or (ii) a copolymer of ethylene and a third α-olefin selected from the group of propylene, butene-1, hexene-1;
(5) the polyethylene comprises the first polyethylene and a second polyethylene, wherein the second polyethylene has an Mw of at least about $1 \times 10^6$;
(6) the second polyethylene is at least one of (i) an ethylene homopolymer or (ii) a copolymer of ethylene and a fourth α-olefin selected from the group of propylene, butene-1, hexene-1;
(7) the amount of the second polyethylene is no more than about 15 wt. %, based on the weight of the second layer material;
(8) the polyethylene has a molecular weight distribution ("Mw/Mn") of about 5 to about 300.

[7] The multi-layer membrane of [6] wherein the polyethylene in the first layer material has an Mw in the range of about $2 \times 10^5$ to about $3 \times 10^6$.

[8] The multi-layer membrane of [6] wherein the polyethylene in the second layer material consists essentially of the first polyethylene, wherein the first polyethylene has an Mw in the range of about $1 \times 10^4$ to about $5 \times 10^5$.

[9] The multi-layer membrane of [6] wherein the first polyethylene is high-density polyethylene and the second polyethylene is ultra-high molecular weight polyethylene.

[10] The multi-layer membrane of [6] wherein the polyethylene in the first layer material comprises 10 wt. % or less of polyethylene having a weight-average molecular weight of $1 \times 10^6$ or more and 90 wt. % or more of polyethylene having a weight-average molecular weight of $1 \times 10^4$ to $5 \times 10^5$, and wherein the polyethylene in the second layer material polyethylene has a weight-average molecular weight of $1 \times 10^4$ to $5 \times 10^5$.

[11] A method for forming a multi-layer, microporous polyolefin membrane, comprising the steps of,
(A) combining a first polyolefin composition and a first solvent to prepare a first polyolefin solution, wherein the first polyolefin composition comprises a first polyethylene resin and a first polypropylene resin; and wherein the amount of the first polyethylene resin is at least about 80 wt. %, based on the weight of the first polyolefin composition;
(B) combining a second polyolefin composition and a second solvent to prepare a second polyolefin solution, wherein the second polyolefin composition comprises a second polyethylene resin and a second polypropylene resin; and wherein the amount of the second polyethylene resin is at least about 50 wt. %, based on the weight of the second polyolefin composition; wherein
(i) the first polyolefin composition contains more polyethylene than the second polyolefin composition on a weight percent basis and
(ii) the amount of polyethylene in the first polyolefin composition plus the amount of polyethylene in the second polyolefin composition is at least about 61 wt. %, based on the combined weight of the first and second polyolefin compositions; and
(C) (C-I) (i) co-extruding at least a portion of the first and the second polyolefin solutions through at least one die to make a multi-layer extrudate, (ii) cooling the multi-layer extrudate, and (iii) removing at least a portion of the first and second solvents;
(C-II) (i) extruding at least a portion of the first and the second polyolefin solutions through at least one die to make plural extrudates, (ii) laminating the plural extrudates to make a multi-layer extrudate, (iii) cooling the multi-layer extrudate, and (iv) removing at least a portion of the first and second solvents;
(C-III) (i) extruding at least a portion of the first and the second polyolefin solutions through at least one die to make plural extrudates, (ii) cooling the plural extrudates, (iii) laminating the cooled plural extrudates, and (iv) removing at least a portion of the first and second solvents;
or
(C-IV) (i) extruding at least a portion of the first and the second polyolefin solutions through at least one die to make plural extrudates, (ii) cooling the plural extrudates, (iii) removing at least a portion of the first and second solvents to make plural microporous polyolefin membranes, and (iv) laminating the plural microporous polyolefin membranes.

[12] The method of [11], wherein (C-I)-(i) (a) at least a portion of the first polyolefin solution is extruded through a first die, (b) at least a portion of the second polyolefin solution is co-extruded through a second die, and (c) at least a portion of either the first or second polyolefin solution is co-extruded through a third die, wherein the extrudate is a multi-layer extrudate which comprises
(i) a first layer and a third layer comprising the extruded first polyolefin solution, and
a second layer comprising the extruded second polyolefin solution located between the first and third layers; or
(ii) a first layer and a third layer comprising the extruded second polyolefin solution, and
a second layer comprising the extruded first polyolefin solution located between the first and third layers;
the method further comprising
(C-I)-(ii) cooling the multi-layer extrudate to form a cooled extrudate,
(C-I)-(iii) removing at least a portion of the first and second solvents from the cooled extrudate to form a solvent-removed extrudate, and
(C-I)-(iv) drying the solvent-removed extrudate in order to form the multi-layer, microporous polyolefin membrane.

[13] The method of [12], further comprising at least one of the following steps in any order:
- (C-I)-(v) stretching the cooled extrudate in at least one lateral direction,
- (C-I)-(vi) treating the cooled extrudate with a hot solvent in order to form a leaf-vein-like structure in the membrane,
- (C-I)-(vii) stretching the multi-layer, microporous polyolefin membrane in at least one lateral direction,
- (C-I)-(viii) heat-treating the multi-layer, microporous polyolefin membrane,
- (C-I)-(ix) cross-linking the multi-layer, microporous polyolefin membrane, and/or
- (C-I)-(x) treating the multi-layer, microporous polyolefin membrane to make the multi-layer, microporous polyolefin membrane more hydrophilic.

[14] The method of [11], wherein (C-II)-(i) (a) at least a portion of the first polyolefin solution is extruded through a first die to make a first extrudate, (b) at least a portion of the second polyolefin solution is extruded through a second die to make a second extrudate, and (c) at least a portion of either the first or second polyolefin solution is extruded through a third die to make a third extrudate, and then (C-II)-(ii) laminating the first, second, and third extrudates to make a multi-layer extrudate which comprises
- (i) a first layer and a third layer comprising the extruded first polyolefin solution, and
  a second layer comprising the extruded second polyolefin solution located between the first and third layers; or
- (ii) a first layer and a third layer comprising the extruded second polyolefin solution, and
  a second layer comprising the extruded first polyolefin solution located between the first and third layers;

the method further comprising
- (C-II)-(iii) cooling the multi-layer extrudate to form a cooled extrudate,
- (C-II)-(iv) removing the at least a portion of the first and second solvents from the cooled extrudate to form a solvent-removed extrudate, and
- (C-II)-(v) drying the solvent-removed extrudate in order to form the multi-layer, microporous polyolefin membrane.

[15] The method of [14], further comprising at least one of the following steps in any order:
- (C-II)-(vi) stretching the cooled extrudate in at least one lateral direction,
- (C-II)-(vii) treating the cooled extrudate with a hot solvent,
- (C-II)-(viii) stretching the multi-layer, microporous polyolefin membrane in at least one lateral direction,
- (C-II)-(ix) heat-treating the multi-layer, microporous polyolefin membrane,
- (C-II)-(x) cross-linking the multi-layer, microporous polyolefin membrane, and/or
- (C-II)-(xi) treating the multi-layer, microporous polyolefin membrane to make the multi-layer, microporous polyolefin membrane more hydrophilic.

[16] The method of [11], wherein (C-III)-(i) at least a portion of the first polyolefin solution is extruded through a first die to make a first extrudate, at least a portion of the second polyolefin solution is extruded through a second die to make a second extrudate, and at least a portion of either the first or second polyolefin solution is extruded through a third die to make a third extrudate;

the method further comprising:
- (C-III)-(ii) cooling first, second, and third extrudates to form first, second, and third cooled extrudates,
- (C-III)-(iii) laminating the first, second, and third cooled extrudates to form a laminate,
- (C-III)-(iv) removing at least a portion of the first and second solvents from laminate to form a solvent-removed laminate, and
- (C-III)-(v) drying the solvent-removed laminate in order to form the multi-layer, microporous polyolefin membrane.

[17] The method of [16], further comprising at least one of the following steps in any order:
- (C-III)-(vi) stretching the laminate and/or at least one of the first or second cooled extrudates in at least one lateral direction,
- (C-III)-(vii) treating the laminate and/or at least one of the first or second cooled extrudates with a hot solvent,
- (C-III)-(viii) stretching the multi-layer, microporous polyolefin membrane in at least one lateral direction,
- (C-III)-(ix) heat-treating the multi-layer, microporous polyolefin membrane,
- (C-III)-(x) cross-linking the multi-layer, microporous polyolefin membrane, and/or
- (C-III)-(xi) treating the multi-layer, microporous polyolefin membrane to make the multi-layer, microporous polyolefin membrane more hydrophilic.

[18] The method of [11], wherein (C-IV)-(i) at least a portion of the first polyolefin solution is extruded through a first die to make a first extrudate, at least a portion of the second polyolefin solution is extruded through a second die to make a second extrudate, and at least a portion of either the first or second polyolefin solution is extruded through a third die to make a third extrudate;

the method further comprising:
- (C-IV)-(ii) cooling first, second, and third extrudates to form first, second, and third cooled extrudates,
- (C-IV)-(iii) removing at least a portion of the first and second solvents from the first, second, and third cooled extrudates, and drying the solvent-removed first, second, and third cooled extrudates to form first, second, and third microporous polyolefin membranes, and
- (C-IV)-(iv) laminating the first, second, and third microporous polyolefin membranes in order to form the multi-layer, microporous polyolefin membrane.

[19] The method of [18], further comprising at least one of the following steps in any order:
- (C-IV)-(v) stretching at least one of the first, second, or third cooled extrudates in at least one lateral direction,
- (C-IV)-(vi) treating at least one of the first, second, or third cooled extrudates with a hot solvent,
- (C-IV)-(vii) stretching at least one of the first, second, or third microporous polyolefin membranes in at least one lateral direction,
- (C-IV)-(viii) heat treating at least one of the first, second, or third microporous polyolefin membranes,
- (C-IV)-(ix) stretching the multi-layer, microporous polyolefin membrane in at least one lateral direction,
- (C-IV)-(x) heat treating the multi-layer, microporous polyolefin membrane,
- (C-IV)-(xi) cross-linking step the multi-layer, microporous polyolefin membrane,
- (C-IV)-(xii) treating the multi-layer, microporous polyolefin membrane to make the multi-layer, microporous polyolefin membrane more hydrophilic.

[20] A multi-layer, microporous membrane made by at least one of the methods of [12] through [19].

[21] The method of [12]-[19], wherein the first polyethylene resin comprises (i) a first polyethylene having an Mw ranging from about $1 \times 10^4$ to about $5 \times 10^5$, or (ii) the first polyethylene and a second polyethylene having an Mw of at least about $1 \times 10^6$.

[22] The method of [12]-[19], wherein the second polyethylene resin comprises (i) a first polyethylene having an Mw ranging from about $1\times10^4$ to about $5\times10^5$, or (ii) the first polyethylene and a second polyethylene having an Mw of at least about $1\times10^6$.

[23] The method of [12]-[19], wherein the first polypropylene resin comprises a first polypropylene having a molecular weight ranging from about $1\times10^4$ to about $4\times10^6$ and wherein the second polypropylene is independently selected from the first polypropylene and comprises a second polypropylene having a molecular weight ranging from about $1\times10^4$ to about $4\times10^6$.

[24] The method of [12]-[19], wherein the first solvent comprises one or more of (i) aliphatic, alicyclic or aromatic hydrocarbons; (ii) mineral oil distillates having boiling points comparable to the aliphatic, alicyclic or aromatic hydrocarbons; (iii) stearyl alcohol, (iv) ceryl alcohol, and (v) paraffin waxes.

[25] The method of [12]-[19], wherein the second solvent comprises one or more of (i) aliphatic, alicyclic or aromatic hydrocarbons; (ii) mineral oil distillates having boiling points comparable to the aliphatic, alicyclic or aromatic hydrocarbons; (iii) stearyl alcohol, (iv) ceryl alcohol, and (v) paraffin waxes.

[26] The method of [12]-[19] further comprising producing a battery containing an anode, a cathode, and at least one separator comprising the multi-layer, microporous polyolefin membrane located between the anode and the cathode.

[27] The method of [26] wherein the battery is a secondary battery.

[28] The method of [27] wherein the battery is a lithium-ion secondary. battery.

[29] The method of [28], further comprising using the battery as a source or sink of electric charge.

[30] A multi-layer microporous polyolefin membrane characterized by an air permeability that does not exceed about 1,000 sec/100 cm$^3$ (normalized to a thickness of 20 μm); a pin puncture strength ranging from about 2000 mN to about 3700 mN (normalized to a thickness of 20 μm), a shutdown speed ranging from about 2 sec. to about 5 sec., a shutdown temperature ranging from about 130° C. to about 135° C., a meltdown temperature of at least about 170° C., and a capacity recovery ratio of at least about 65.

EFFECT OF THE INVENTION

The multi-layer, microporous polyolefin membrane of the invention has well-balanced capacity recovery ratio, air permeability, pin puncture strength, shutdown temperature, shutdown speed and meltdown temperature. The use of such multi-layer, microporous polyolefin membrane for separators provides batteries having excellent safety, heat resistance, retention properties and productivity.

The invention claimed is:

1. A multi-layer, microporous polyolefin membrane, comprising: a first layer material and a second layer material, the first and second layer materials comprising polyethylene and polypropylene, wherein
   (i) the first layer material contains polyethylene in a first amount of at least 80 wt. %, based on the weight of the first material;
   (ii) the second layer material contains polyethylene in a second amount of at least 50 wt. %, based on the weight of the second material;
   (iii) the first amount is greater than the second amount on a weight percent basis,
   (iv) the multi-layer, microporous polyolefin membrane contains polyethylene in a total amount of at least 61 wt. %, based on the combined weight of the first and second layer materials, and
   (v) a content of polypropylene in the first layer material is less than a content of polypropylene in the second layer material on a weight percent basis, and
wherein the polypropylene is a propylene homopolymer, and wherein the multi-layer membrane comprises:
   a first microporous layer containing the first layer material, a third microporous layer containing the first layer material, and a second microporous layer containing the second layer material, the second microporous layer being located between the first and third microporous layers.

2. The multi-layer membrane of claim 1, wherein the first amount ranges from 80 wt. % to 99.5 wt. %, the second amount ranges from 50 wt. % to 85 wt. %, the first layer material contains at least 5 wt. % more polyethylene than the second layer material based on the weights of the first and second layer materials, and the total amount ranges from 70 wt. % to 90 wt. %.

3. The multi-layer membrane of claim 1, wherein the polyethylene comprises a first polyethylene and a second polyethylene, wherein
   (a) the polyethylene in first layer material has at least one characteristic selected from:
     (1) the polyethylene has a Mw in the range of $1\times10^4$ to $1\times10^7$;
     (2) the first polyethylene has an Mw ranging from $1\times10^4$ to $5\times10^5$;
     (3) the polyethylene comprises the first polyethylene and the second polyethylene, wherein the second polyethylene has an Mw of at least $1\times10^6$;
   (b) the polypropylene in the first or second layer materials has an Mw ranging from $1\times10^4$ to $4\times10^6$;
   (c) the polyethylene in the second layer material has at least one characteristic selected from:
     (1) the polyethylene has an Mw in the range of $1\times10^4$ to $1\times10^7$;
     (2) the polyethylene comprises the first polyethylene having an Mw ranging from $1\times10^4$ to $5\times10^5$;
     (3) the polyethylene comprises the first polyethylene and the second polyethylene, wherein the second polyethylene has an Mw of at least $1\times10^6$.

4. The multi-layer membrane of claim 3, wherein the polyethylene in the first layer material has an Mw in the range of $2\times10^5$ to $3\times10^6$.

5. The multi-layer membrane of claim 3, wherein the polyethylene in the second layer material consists essentially of the first polyethylene, wherein the first polyethylene has an Mw in the range of $1\times10^4$ to $5\times10^5$.

6. The multi-layer membrane of claim 3, wherein the first polyethylene is high-density polyethylene and the second polyethylene is ultra-high-molecular-weight polyethylene.

7. The multi-layer membrane of claim 3, wherein the polyethylene in the first layer material comprises 10 wt. % or less of polyethylene having a weight-average molecular weight of $1\times10^6$ or more and 90 wt. % or more of polyethylene having a weight-average molecular weight of $1\times10^4$ to $5\times10^5$, and wherein the polyethylene in the second layer material polyethylene has a weight-average molecular weight of $1\times10^4$ to $5\times10^5$.

* * * * *